(12) United States Patent
Lee et al.

(10) Patent No.: US 11,329,496 B2
(45) Date of Patent: May 10, 2022

(54) CHARGING AND DISCHARGING APPARATUS INCLUDING COOLING FAN AND MOVABLE TEMPERATURE MEASURING DEVICE FOR SECONDARY BATTERY

(71) Applicant: LG CHEM, LTD., Seoul (KR)

(72) Inventors: Beom-Koon Lee, Daejeon (KR);
Hyo-Jin Park, Daejeon (KR);
Dong-Hun Bae, Daejeon (KR);
Joon-Sung Bae, Daejeon (KR);
Eui-Kyung Lee, Daejeon (KR);
Suk-Hyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 224 days.

(21) Appl. No.: 16/771,498

(22) PCT Filed: Nov. 19, 2019

(86) PCT No.: PCT/KR2019/015885
§ 371 (c)(1),
(2) Date: Jun. 10, 2020

(87) PCT Pub. No.: WO2020/130372
PCT Pub. Date: Jun. 25, 2020

(65) Prior Publication Data
US 2021/0226472 A1  Jul. 22, 2021

(30) Foreign Application Priority Data
Dec. 21, 2018  (KR) .......................... 10-2018-0167882

(51) Int. Cl.
*H02J 7/00* (2006.01)
*H01M 10/613* (2014.01)
*H01M 10/6563* (2014.01)

(52) U.S. Cl.
CPC ..... *H02J 7/007194* (2020.01); *H01M 10/613* (2015.04); *H01M 10/6563* (2015.04); *H02J 7/00309* (2020.01)

(58) Field of Classification Search
USPC ......................................... 320/153
See application file for complete search history.

(56) References Cited

U.S. PATENT DOCUMENTS

2005/0200332 A1* 9/2005 Kangas ................ H02J 7/0013
320/128
2012/0161677 A1* 6/2012 Kunimitsu ........ H01M 10/4207
320/134

(Continued)

FOREIGN PATENT DOCUMENTS

JP   2008-198515 A   8/2008
JP   2015-41487 A   3/2015

(Continued)

OTHER PUBLICATIONS

Extended European Search Report, dated May 14, 2021, for European Application No. 19699080.6.

*Primary Examiner* — Samuel Berhanu
(74) *Attorney, Agent, or Firm* — Birch, Stewart, Kolasch & Birch, LLP

(57) ABSTRACT

A charging and discharging apparatus including a temperature measuring device suitable for measuring a temperature of each secondary battery and a cooling fan for cooling secondary batteries by utilizing temperature information using the temperature measuring device, such that a temperature deviation between the secondary batteries, which may occur during charging and discharging in a formation process and a capacity test after a secondary battery assembly process, is provided. The charging and discharging apparatus includes a movable non-contact temperature measuring device and cooling fans of which directions of wind (Continued)

and outputs are individually adjusted based on temperature information measured by the temperature measuring device according to a location in each secondary battery.

12 Claims, 16 Drawing Sheets

(56) References Cited

U.S. PATENT DOCUMENTS

2013/0164579 A1  6/2013  Harii et al.
2016/0144546 A1  5/2016  Song et al.
2016/0204481 A1* 7/2016  Ryu ...................... H01M 50/20
                                                            429/7

FOREIGN PATENT DOCUMENTS

| JP | 3215572 U | 3/2018 |
| KR | 20-1999-002557 U | 1/1999 |
| KR | 20-0237797 Y1 | 10/2001 |
| KR | 10-2006-0081252 A | 7/2006 |
| KR | 10-2012-0023369 A | 3/2012 |
| KR | 10-2012-0088219 A | 8/2012 |
| KR | 10-2013-0029412 A | 3/2013 |
| KR | 10-2015-0049890 A | 5/2015 |
| KR | 10-1816843 B1 | 1/2016 |
| KR | 10-1617337 B1 | 5/2016 |
| KR | 10-2017-0100341 A | 9/2017 |
| KR | 10-2018-0112351 A | 10/2018 |

* cited by examiner

CHARGING AND DISCHARGING APPARATUS INCLUDING COOLING FAN AND MOVABLE TEMPERATURE MEASURING DEVICE FOR SECONDARY BATTERY

TECHNICAL FIELD

The present disclosure relates to a charging and discharging apparatus for a secondary battery, and more particularly, to a charging and discharging apparatus including a device for measuring a temperature of a secondary battery and a cooling fan for cooling the secondary battery according to the temperature measured by the device.

The present application claims priority to Korean Patent Application No. 10-2018-0167882 filed on Dec. 21, 2018 in the Republic of Korea, the disclosures of which are incorporated herein by reference.

BACKGROUND ART

With the increase in technology development and demands for movable devices, electric vehicles, hybrid vehicles, energy storage systems (ESSs), uninterrupted power system (UPS), and the like, demands for secondary batteries as energy sources are rapidly increasing and accordingly, many studies on secondary batteries that meet various requirements are being conducted.

Since the secondary batteries are assembled in a discharged state, the secondary batteries function as a battery only after the secondary batteries are assembled and then activated via charging. Thus, after a secondary battery assembly process, a formation process in which charging and discharging for assigning excellent charging and discharging characteristics to the assembled secondary batteries are performed and an evaluation process including a capacity test for examining whether charging and discharging capacity is sufficient are performed.

Charging and discharging operation of the secondary battery in the formation process and capacity test is performed by, for example, an apparatus shown in FIG. 1.

Referring to FIG. 1, a plurality of secondary batteries 1 are arranged in a tray 3 and charging and discharging are performed at once while pins (not shown) capable of individually applying power are in contact with each secondary battery 1.

A temperature of the secondary battery 1 is increased when the charging and discharging of the secondary battery 1 are performed. When the temperature of the secondary battery 1 is increased, the charging and discharging operation is unable to be smoothly performed. Thus, a suitable cooling unit needs to be provided when the charging and discharging are performed, and generally, a cooling operation is performed on the plurality of secondary batteries 1 via a cooling fan 5 that is a cooling device, after placing the tray 3 in a chamber (not shown).

A defective secondary battery may be different from a normal battery in temperature behavior or the like at initial charging and discharging. Accordingly, the defective secondary battery may be identified by measuring a temperature. In the related art, a thermocouple 7 is used to measure a temperature.

However, a temperature deviation may occur between the secondary batteries 1 due to heat generation of the secondary batteries 1 during charging. A lithium secondary battery forms a solid electrolyte interface (SEI) film with initial charging and is usually charged via a low current of 0.1 C-rate. However, when high-rate charging is performed with a larger C-rate to reduce a process time, heat generation increases, thereby increasing the temperature deviation between the secondary batteries 1. The temperature deviation may occur due to the outside air according to opening and closing of a door of the chamber where the tray 3 is placed. However, a current degree of cooling by the cooling fan 5 is often insufficient to reduce the temperature deviation between the secondary batteries 1. Moreover, since the cooling fan 5 currently used to adjust the temperature operates at the same output regardless of the actual temperature of the secondary battery, the cooling fan 5 is not helpful in reducing the temperature deviation.

The temperature deviation between the secondary batteries 1 causes a change in the resistance and voltage, thereby causing an increase in the capacity test deviation. Although the charging and discharging capacity is calculated by using a correction equation according to a temperature such that a difference between an actual temperature and a setting temperature of the cooling fan 5 is corrected by measuring the temperature using the thermocouple 7, the existing thermocouple 7 measures an ambient temperature in the tray 3 instead of the temperature of each secondary battery 1, and thus the temperature deviation between the secondary batteries 1 in the tray 3 is unable to be reflected.

DISCLOSURE

Technical Problem

The present disclosure is designed to solve the problems of the related art, and therefore the present disclosure is directed to providing a charging and discharging apparatus including a temperature measuring device suitable for measuring a temperature of each secondary battery and a cooling fan for cooling secondary batteries by utilizing temperature information using the temperature measuring device, such that a temperature deviation between the secondary batteries, which may occur during charging and discharging in a formation process and a capacity test after a secondary battery assembly process, is considered.

Other objects and advantages of the present disclosure can be understood by the following description and will be more clearly understood by embodiments of the present disclosure. It will also be readily apparent that the objects and advantages of the present disclosure may be realized by the means indicated in claims and combinations thereof.

Technical Solution

In one aspect of the present disclosure, there is provided a charging and discharging apparatus including: a temperature measuring device for measuring a temperature of at least one secondary battery of a plurality of secondary batteries arranged spaced apart from each other along an X-axis direction in an upright state with a side of the at least one secondary battery extending in a Y-axis direction at a bottom of the at least one secondary battery; a tray configured to accommodate the plurality of secondary batteries arranged spaced apart from each other in the X-axis direction in the upright state; a charging and discharging probe connected to a power supplier, which are capable of individually applying power to the plurality of secondary batteries; and a plurality of cooling fans provided to cool the plurality of secondary batteries and of which directions of wind and outputs are individually adjusted based on temperature information measured by the temperature measuring device according to a location in each secondary battery of the plurality of secondary batteries, wherein the temperature measuring device includes: a non-contact temperature sensor unit being insertable into a space between adjacent secondary batteries of the plurality of secondary batteries to measure a temperature of the at least one secondary battery that the non-contact temperature sensor faces in a non-contact manner; and a Z-axis transfer device configured to raise or lower the non-contact temperature sensor unit in a Z-axis direction perpendicular to the X-axis direction and the Y-axis direction to insert the non-contact temperature sensor unit into the space downward from a location spaced apart from the plurality of secondary batteries in the Z-axis direction and to withdraw the non-contact temperature sensor unit upward.

According to the present disclosure, the plurality of cooling fans may be provided in row and column directions at an upper portion of the tray to blow air to the plurality of secondary batteries directly below, and wherein the directions of the wind may be adjusted by adjusting an angle with respect to a horizontal plane. Alternatively, the plurality of cooling fans may be provided in row and column directions on a surface of a side portion of the tray to face electrode leads of the plurality of secondary batteries.

According to the present disclosure, the plurality of cooling fans may intensively cools a portion of the plurality of secondary batteries where a temperature is higher based on the temperature information measured by the temperature measuring device according to the location in each of the plurality of secondary batteries to reduce a temperature deviation from another portion of the plurality of secondary batteries.

According to the present disclosure, temperature measurement by the temperature measuring device and direction of wind and output adjustment by the plurality of cooling fans may be interconnectedly performed in real-time.

According to an embodiment, the temperature measuring device may further include a Y-axis transfer device configured to transfer the Z-axis transfer device mounted thereon along the Y-axis direction. The non-contact temperature sensor unit may include a single temperature sensor or include multiple temperature sensors arranged along the Z-axis in a length corresponding to a side of the at least one secondary battery extending in the Z axis direction.

According to another embodiment, the temperature measuring device may further include an X-axis transfer device configured to transfer the Y-axis transfer device mounted thereon along the X-axis direction. The non-contact temperature sensor unit may include a single temperature sensor or include multiple temperature sensors arranged along the Z-axis in a length corresponding to a side of the at least one secondary battery extending in the Z-axis direction.

According to another embodiment, the temperature measuring device may further include an X-axis transfer device configured to transfer the Z-axis transfer device mounted thereon along the X-axis direction. The non-contact temperature sensor unit may include multiple temperature sensors arranged along the Y-axis direction in a length corresponding to the side of the at least one secondary battery extending in the Y-axis direction or include a plate member having an area corresponding to an area defined in a Y-Z plane of the at least one secondary battery with multiple temperature sensors arranged on the plate member along the Y-axis and Z-axis directions.

According to another embodiment, the non-contact temperature sensor unit may further include a temperature sensor for measuring an ambient temperature.

According to various modifications, in the charging and discharging apparatus of the present disclosure, the numbers of non-contact temperature sensor units and Z-axis transfer devices may correspond to the number of secondary batteries. In this case, an X-axis transfer device may not be required.

According to various modifications, the temperature measuring device may further include an X-axis transfer device for transferring the Z-axis transfer device along an X-axis direction with the Z-axis transfer device mounted thereon, without a Y-axis transfer device. Here, the non-contact temperature sensor unit may include multiple temperature sensors arranged along the Y-axis direction in a length corresponding to the one side in the Y-axis direction of the plurality of secondary batteries or include a plate member having an area corresponding to an area of the plurality of secondary batteries on a Y-Z plane and multiple temperature sensors arranged on the plate member along the Y-axis and Z-axis directions.

According to various modifications, the Y-axis transfer device of the temperature measuring device may include: a Y-axis guide beam to which a Y-axis LM guide is attached in a length direction thereof at a location spaced apart in the Z-axis direction upward to be parallel with another side in the Y-axis direction of the plurality of secondary batteries; and a Y-axis slide block including a Y-axis LM slider sliding in the length direction by engaging with the Y-axis LM guide to reciprocate in the length direction of the Y-axis guide beam, wherein the Z-axis transfer device may be connected to the Y-axis slide block.

Also, the Z-axis transfer device may include: a Z-axis guide beam erected to form a right angle with the Y-axis guide beam and to which a Z-axis LM guide is attached in a length direction thereof; and a Z-axis slide block including a Z-axis LM slider sliding in the length direction by engaging with the Z-axis LM guide to reciprocate in the length direction of the Z-axis guide beam, or may be a link unit including at least one X-shaped link where two link members are rotatably cross-linked.

According to an embodiment in which the temperature measuring device further includes the X-axis transfer device in addition to the Y-axis transfer device, the X-axis transfer device may include: a pair of parallel X-axis guide beams forming right angles with the Y-axis guide beam on an X-Y plane and to which an X-axis LM guide is attached in a length direction thereof; and an X-axis LM slider at both ends of the Y-axis guide beam, the X-axis LM slider sliding in the length direction by engaging with the X-axis LM guide, wherein the X-axis LM slider may be connected to the both ends of the Y-axis guide beam.

According to an embodiment in which the temperature measuring device further includes the X-axis transfer device without a Y-axis transfer device, the X-axis transfer device may include: a pair of parallel X-axis guide beams to which an X-axis LM guide is attached in a length direction thereof at a location spaced apart in the Z-axis direction upward to be perpendicular to another side in the Y-axis direction of the plurality of secondary batteries on an X-Y plane; and an X-axis slide block including an X-axis LM slider sliding in the length direction by engaging with the X-axis LM guide to reciprocate in the length direction of the X-axis guide beam, wherein the Z-axis transfer device may be connected to the X-axis slide block.

At this time as well, the Z-axis transfer device may include: a Z-axis guide beam erected to form a right angle with the X-axis guide beam and to which a Z-axis LM guide is attached in a length direction thereof; and a Z-axis slide block including a Z-axis LM slider sliding in the length direction by engaging with the Z-axis LM guide to reciprocate in the length direction of the Z-axis guide beam, or may be a link unit including at least one X-shaped link where two link members are rotatably cross-linked.

Advantageous Effects

According to the present disclosure, a temperature of each of a plurality of secondary batteries can be measured. Accordingly, for example, the temperature of each secondary battery can be measured during a formation process and capacity test after a secondary battery assembly process. Since a temperature deviation between the secondary batteries is obtained, the temperature deviation can be considered while calculating capacity. Since the temperature is measured by the unit of secondary battery instead of unit of tray, the accuracy of temperature correction during the capacity test can be improved.

According to the present disclosure, the temperature can be quickly measured in a non-contact manner without affecting the secondary battery, by using a non-contact temperature sensor unit.

According to the present disclosure, a movable temperature measuring device that transfers a non-contact temperature sensor unit via Z-axis ascending and descending by a Z-axis transfer device is basically provided. Here, when a Y-axis transfer device and/or an X-axis transfer device are further provided, the number of non-contact temperature sensors required for measuring the temperature of each secondary battery can be reduced. As such, the temperature of the plurality of secondary batteries can be measured by using the number of non-contact temperature sensors as small as possible by implementing the temperature measuring device in a movable type.

According to the present disclosure, since temperatures of a plurality of locations of the secondary battery can be measured by using a single sensor or multiple sensors, research data can be obtained by recording the measured temperatures to build a database (DB).

According to the present disclosure, the temperature of each secondary battery inside a tray can be measured by using the non-contact temperature sensor unit and a direction of the wind and an output of cooling fan can be adjusted in response to the temperature of the secondary battery, which changes continuously during charging and discharging, based on the measured temperature information. Accordingly, the charging and discharging of the uniform quality can be realized by improving a temperature deviation.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
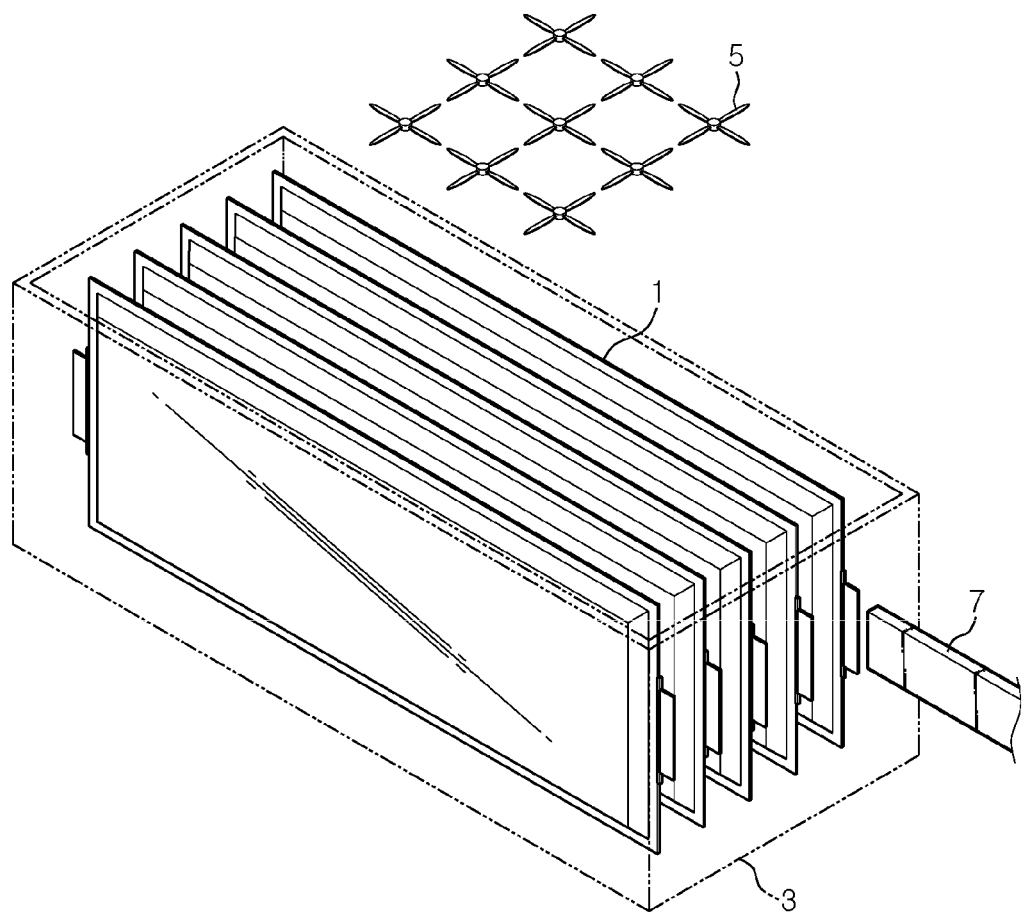
FIG. 1 illustrates an apparatus for performing a charging and discharging operation of a conventional secondary battery.

Hereinafter, preferred embodiments of the present disclosure will be described in detail with reference to the accompanying drawings. However, the embodiments according to the present disclosure may be modified in various forms, and the scope of the present disclosure should not be construed as being limited to the following embodiments. The embodiments of the present disclosure are provided to more fully explain the present disclosure to those skilled in the art.

The terms or words used in the specification and claims should not to be construed as being limited to common or dictionary meanings, but should be interpreted as meanings and concepts corresponding to the technical ideas of the present disclosure based on the principle that the inventors may appropriately define the concept of terms in order to best describe their invention. Therefore, since the embodiments described in the specification and the configurations shown in the drawings are merely the most preferred embodiments of the present disclosure and do not represent all of the technical ideas of the present disclosure, it should be understood that there may be various equivalents and modifications that can replace the embodiments at the time of the present application.

In addition, in describing the present disclosure, when it is determined that the detailed description of the related well-known configuration or function may obscure the gist of the present disclosure, the detailed description thereof will be omitted. The shapes of elements in the drawings are exaggerated to emphasize clearer description and the same reference numerals denote to the same elements.

Throughout the specification, when a part "includes" a certain component, it means that the part may further include another component, without excluding the other component, unless otherwise stated. In addition, throughout the specification, when a part is "connected" to another part, the part may not only be "directly connected", but may also be "indirectly connected" to the other part with another element therebetween.

The present disclosure proposes a charging and discharging apparatus basically including a temperature measuring device for measuring a temperature of each of a plurality of secondary batteries by using a non-contact temperature sensor and cooling fans of which directions of wind and outputs are individually adjusted according to temperature information according to a location in each of the plurality of secondary batteries, the temperature information being measured by the temperature measuring device. Because the non-contact temperature sensor is included in a non-contact temperature sensor unit and the non-contact temperature sensor unit is transferred via Z-axis ascending and descending by a Z-axis transfer device, the temperature measuring device included in the charging and discharging apparatus according to the present disclosure may be referred to as a movable temperature measuring device.

According to the present disclosure, it is possible to quickly measure the temperature in a non-contact manner without affecting the secondary battery, by using the non-contact temperature sensor unit. An example of the non-contact temperature sensor includes an infrared sensor. The number of non-contact temperature sensors may be increased or decreased as needed. In other words, the number of temperature sensors for measuring a temperature may be one or more.

In other words, the non-contact temperature sensor may be a single temperature sensor or multiple temperature sensors. In each case, the temperature measuring device may further include a Y-axis transfer device and/or an X-axis transfer device for efficient driving. In other words, a 2-axis transfer device including the Z-axis transfer device and the Y-axis transfer device, a 2-axis transfer device including the Z-axis transfer device and the X-axis transfer device, or a 3-axis transfer device including all of the Z-axis transfer device, the Y-axis transfer device, and the X-axis transfer device is possible.

First, first and second embodiments relate to a charging and discharging apparatus including a temperature measuring device using a single temperature sensor, wherein the single temperature sensor includes 3-axis transfer device including an X-axis transfer device, a Y-axis transfer device, and a Z-axis transfer device to be suitable for measuring a temperature of each of a plurality of secondary batteries. A third embodiment relates to a case in which a temperature measuring device including a plurality of single temperature sensors is included, wherein an X-axis transfer device may be omitted. Fourth through sixth embodiments relate to a charging and discharging apparatus including a temperature measuring device using multiple temperature sensors. Here, in the fifth embodiment, a Y-axis transfer device may be omitted according to an axial arrangement of the multiple temperature sensors, and in the sixth embodiment, an X-axis transfer device may also be omitted as a plurality of multiple temperature sensors are provided. The present disclosure will be described in detail below.

Figure 2:
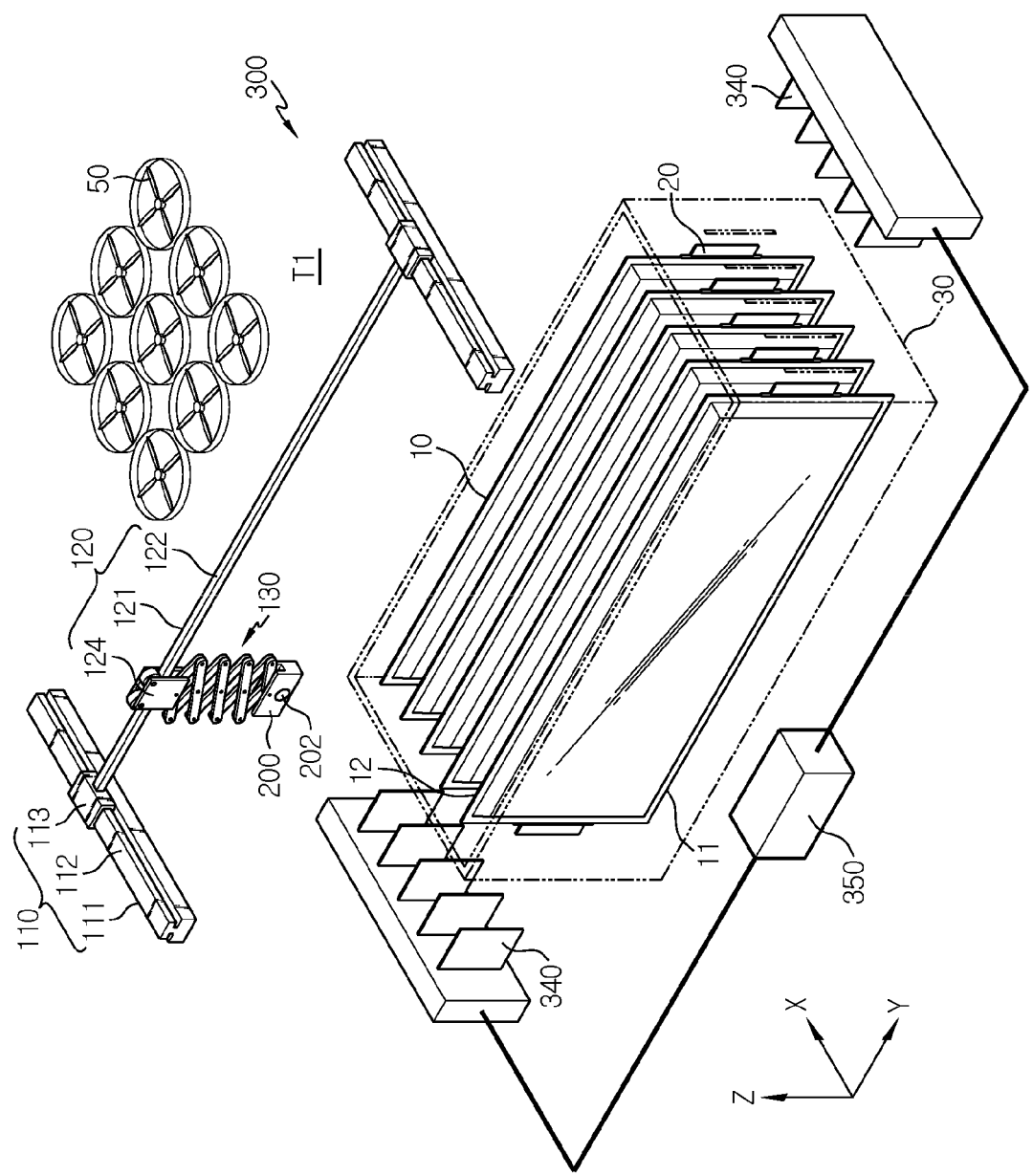
FIG. 2 illustrates a charging and discharging apparatus according to a first embodiment of the present disclosure.

FIG. 2 illustrates a charging and discharging apparatus according to a first embodiment of the present disclosure. In the current embodiment, a non-contact temperature sensor includes a temperature measuring device configured to move in three axes and a plurality of cooling fans of which directions of wind and outputs are individually adjusted according to temperature information measured by the temperature measuring device.

First, the charging and discharging apparatus 300 includes a tray 30 in which a plurality of secondary batteries 10 spaced apart from each other along an X-axis direction while being erected with one side 11 in a Y-axis direction at a bottom thereof are arranged and accommodated. Also, the charging and discharging apparatus 300 includes the temperature measuring device T1. A charging and discharging probe 340 and a power supplier 350 for applying power individually to the secondary batteries 10 accommodated in the tray 30 are also included. The plurality of cooling fans 50 are provided at an upper portion of the tray 30.

The tray 30 has a structure of an approximately rectangular parallelepiped shape and includes a space where the secondary batteries 10 are arranged and accommodated therein, and an upper part of the tray 30 is opened such that the temperature measuring device T1 and a non-contact temperature sensor unit 200 are inserted into, transferred in, and withdrawn from a space S between the secondary batteries 10. The charging and discharging probe 340 is connected to electrode leads 20 of the secondary batteries 10 and applies a current from the power supplier 350. For convenience of the connection, for example, a slot (not shown) that is insertable into or removable from the charging and discharging probe 340 may be provided at a side of the tray 30 where the electrode leads 20 of the secondary batteries 10 are placed, but the present disclosure is not limited only to such a structure of the tray 30 and a specific connection structure of the charging and discharging probe 340.

The secondary batteries 10 are accommodated and arranged in the tray 30. The drawing is provided for easy understanding, and the actual number of secondary batteries per tray may be different from the drawing.

The temperature measuring device T1 will be described in detail later and may be configured such that the non-contact temperature sensor measures a temperature by moving in 3 axes to obtain temperature information by measuring the temperature for each secondary battery 10 and for each location in the secondary battery 10.

The plurality of cooling fans 50 are provided at the upper portion of the tray 30. The cooling fans 50 may be provided in certain row and column directions. In the drawing, the cooling fans 50 are arranged in a 3×3 matrix, but the present disclosure is not limited to such an arrangement. The directions of wind and outputs of the cooling fans 50 are individually adjusted based on the temperature information measured by the temperature measuring device T1 according to the location in each of the secondary batteries 10.

By using the charging and discharging apparatus 300, the temperature of each secondary battery 10 may be measured via the temperature measuring device T1 while charging and discharging the secondary battery 10 in the tray 30. First, because the temperature deviation between the secondary batteries 10 is obtained, such a temperature deviation may be considered during capacity calculation. Because the temperature is measured in units of the secondary batteries 10 instead of units of the trays 30, the accuracy of temperature correction during the capacity test is improved. Also, it is possible to cool down the secondary batteries 10 while reducing the temperature deviation by adjusting the directions of wind and outputs of the cooling fans 50 according to the temperature information.

Figure 3:
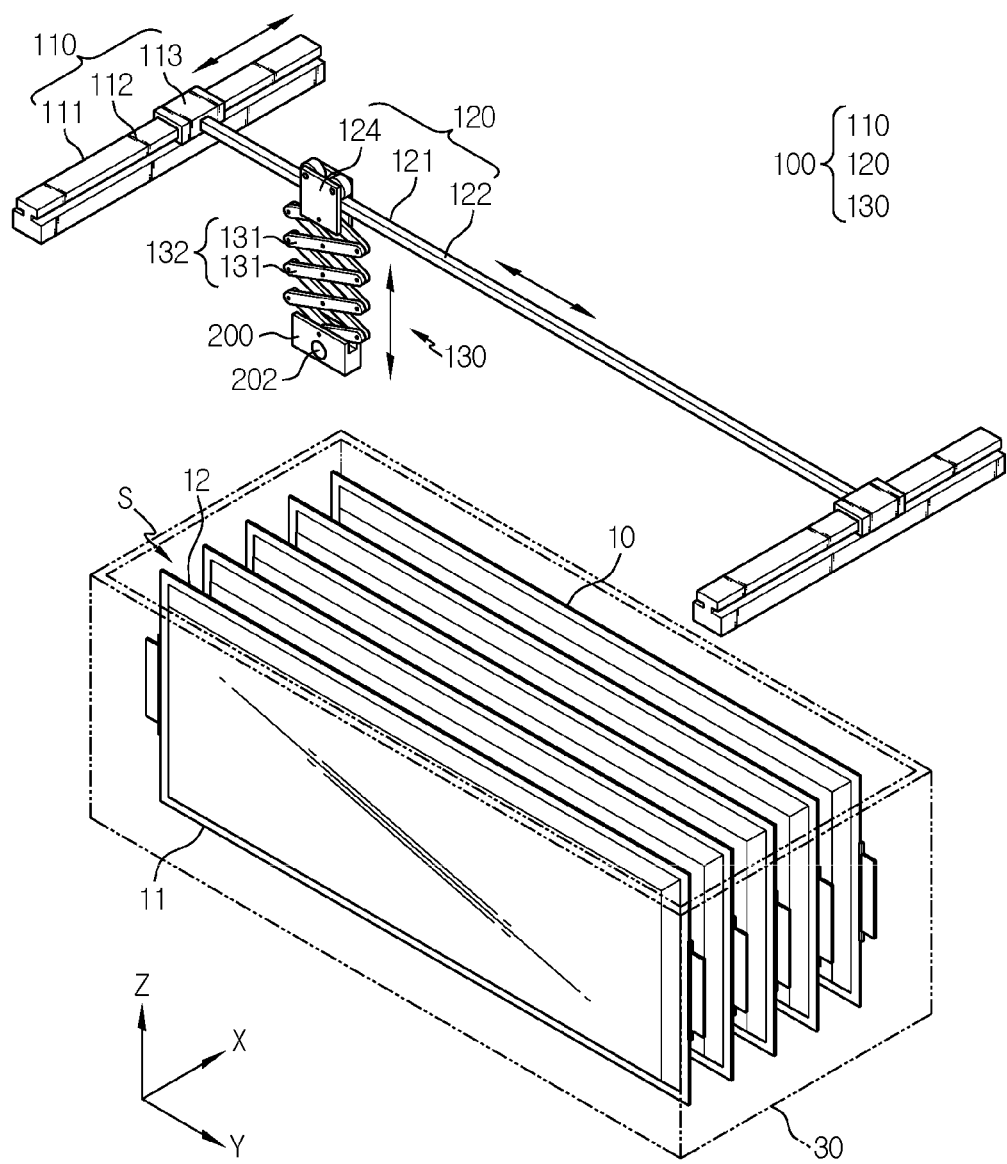
FIG. 3 illustrates a temperature measuring device included in the charging and discharging apparatus, according to the first embodiment of the present disclosure.
Figure 4:
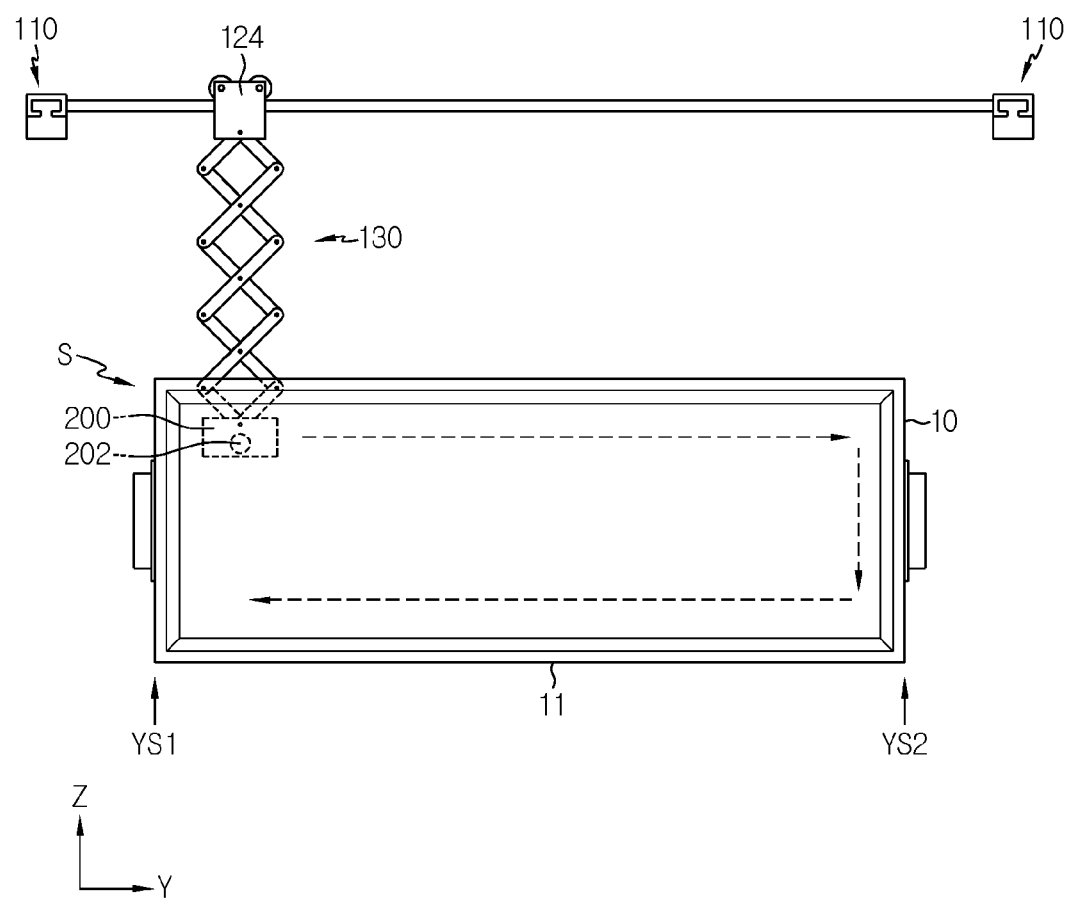
FIGS. 4 and 5 are diagrams for describing a method of measuring a temperature of one secondary battery by using the temperature measuring device included in the charging and discharging apparatus, according to the first embodiment of the present disclosure.
Figure 5:
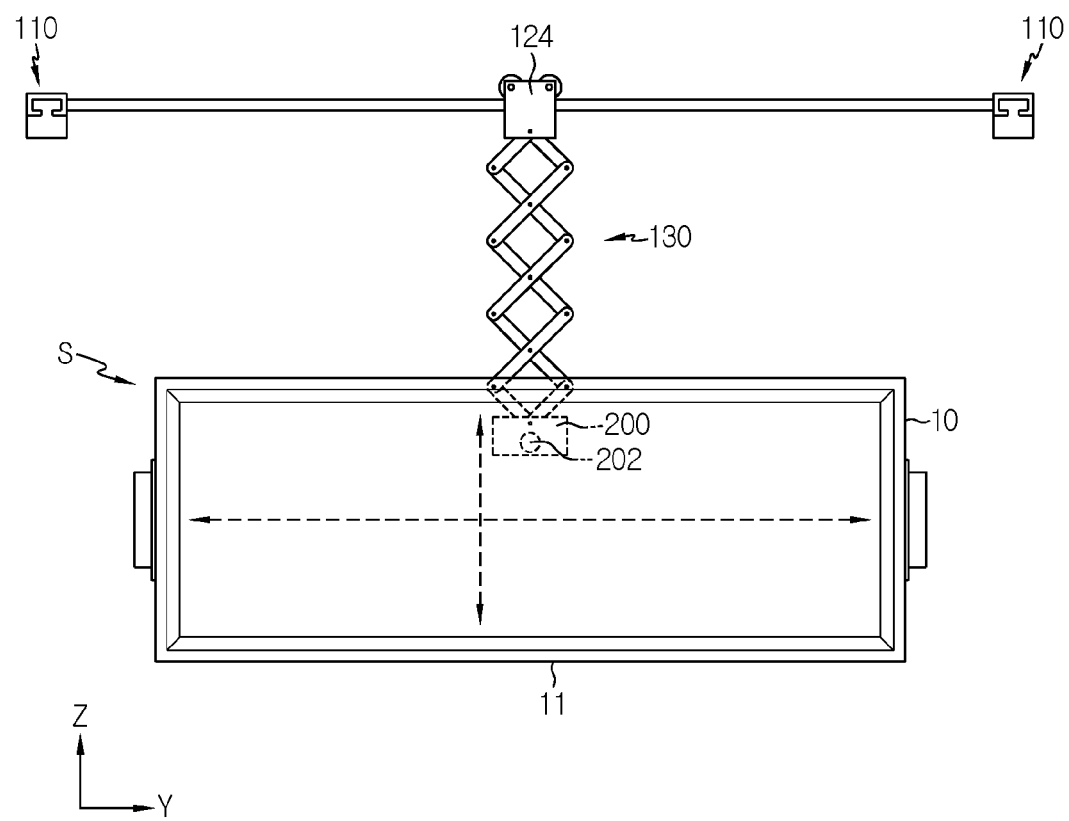

FIG. 3 illustrates the temperature measuring device T1 included in the charging and discharging apparatus, according to the first embodiment of the present disclosure. FIGS. 4 and 5 are diagrams for describing a method of measuring a temperature of one secondary battery 10 by using the temperature measuring device T1 included in the charging and discharging apparatus 300, according to the first embodiment of the present disclosure.

Referring to FIG. 3, the temperature measuring device T1 includes a 3-axis transfer device 100 and the non-contact temperature sensor unit 200. The 3-axis transfer device 100 includes an X-axis transfer device 110, a Y-axis transfer device 120, and a Z-axis transfer device 130. The 3-axis transfer device 100 may be formed of an aluminum material or stainless steel, which is light and has excellent durability, but the present disclosure is not limited by the material and characteristics thereof. The non-contact temperature sensor unit 200 is connected to the Z-axis transfer device 130. The non-contact temperature sensor unit 200 is inserted into the space S between the secondary batteries 10 by the 3-axis transfer device 100 and measures the temperature of the facing secondary battery 10 in a non-contact manner.

The X-axis transfer device 110 includes a pair of parallel X-axis guide beams 111 at a location spaced apart in a Z-axis direction upward to be perpendicular to another side 12 in the Y-axis direction of the secondary batteries 10 on an X-Y plane. For example, the pair of X-axis guide beams 111 are provided above the secondary batteries 10 while being spaced apart from each other at least by a length of the One side 11 in the Y-axis direction of the secondary batteries 10, along the Y-axis direction of the secondary batteries 10. An x-axis LM guide 112 is attached to the X-axis guide beam 111 in a length direction thereof. The X-axis transfer device 110 also includes an X-axis LM slider 113 that slides in the length direction while being engaged with the X-axis LM guide 112.

The Y-axis transfer device 120 includes a Y-axis guide beam 121 at a location spaced apart from the secondary batteries 10 upward in a Z-axis direction to be perpendicular to the X-axis guide beam 111 on the X-Y plane, i.e., to be parallel to the other side 12 in the Y-axis direction of the secondary batteries 10. The Y-axis guide beam 121 may be connected between the pair o X-axis guide beams 111 in an approximately bridge structure. A Y-axis LM guide 122 is attached to the Y-axis guide beam 121 in a length direction thereof. Both ends of the Y-axis guide beam 121 are connected to the X-axis LM slider 113. The Y-axis transfer device 120 includes a Y-axis slide block 124 including a Y-axis LM slider sliding in the length direction by engaging with the Y-axis LM guide 122 to reciprocate in the length direction of the Y-axis guide beam 121.

The Z-axis transfer device 130 may be connected to the Y-axis slide block 124. In the current embodiment, the Z-axis transfer device 130 is a link unit including one or more X-shaped links 132 in which two link members 131 are rotatably cross-combined. The link unit may also be referred to as a scissor arm or scissor lift. The non-contact temperature sensor unit 200 is connected to a bottom of the Z-axis transfer device 130 and the Z-axis transfer device 130 ascends or descends the non-contact temperature sensor unit 200 in the Z-axis direction. In particular, the Z-axis transfer device 130 may insert the non-contact temperature sensor unit 200 into the space S downward from a location spaced apart from the secondary batteries 10 upward in the Z-axis direction, and withdraw the non-contact temperature sensor unit 200 in a direction opposite to an insertion direction.

As such, the Y-axis transfer device 120 transfers the Z-axis transfer device 130 along the Y-axis direction with the Z-axis transfer device 130 mounted thereon, and the X-axis transfer device 110 transfers the Y-axis transfer device 120 along the X-axis direction with the Y-axis transfer device 120 mounted thereon. The non-contact temperature sensor unit 200 is connected to the Z-axis transfer device 130, and the Z-axis transfer device 130 ascends or descends the non-contact temperature sensor unit 200 in the Z-axis direction. Thus, the non-contact temperature sensor unit 200 is capable of moving in 3 axes along an X-axis, a Y-axis, and a Z-axis.

A single temperature sensor 202 is provided at the non-contact temperature sensor unit 200. The method of measuring the temperatures of the plurality of secondary batteries 10 by using the non-contact temperature sensor unit 200 may be performed as follows.

The non-contact temperature sensor unit 200 measures the temperature from one side in the X-axis direction. In other words, the measurement starts from an outermost secondary battery among the arranged plurality of secondary batteries 10.

Referring to FIG. 4, the non-contact temperature sensor unit 200 may enter into the space S by being inserted downward by the Z-axis transfer device 130 from one side YS1 in the Y-axis direction near the other side 12 in the Y-axis direction of the secondary batteries 10 may be transferred up to another side YS2 in the Y-axis direction by the Y-axis transfer device 120, may be further transferred downward along the Z-axis direction by the Z-axis transfer device 130, and then may be transferred from the other side YS2 Y-axis direction to the one side YS1 in the Y-axis direction by the Y-axis transfer device. By repeating such processes at least once, the non-contact temperature sensor unit 200 may be withdrawn to the upper part along the Z-axis direction after being inserted near the one side 11 in the Y-axis direction of the facing secondary battery 10 inside the space S, and sequentially measure temperatures of several locations of the facing secondary batter 10 with respect to an area of a Y-X plane while being transferred inside the space S. Meanwhile, the temperatures of the several locations of the facing secondary battery 10 with respect to the area of the Y-Z plane may be measured sequentially in any order along up, down, left, and right directions as shown in FIG. 5, in addition to a zigzag manner on the Y-Z plane as described with reference to FIG. 4.

When the measuring of the temperature of the outermost secondary battery is completed as such, the Y-axis transfer device 120 is transferred to the next secondary battery 10 along the X-axis direction by the X-axis transfer device 110 to measure a temperature. When the Y-axis transfer device 120 is transferred, the Z-axis transfer device 130 and the non-contact temperature sensor unit 200 are transferred together. The non-contact temperature sensor unit 200 sequentially measures temperatures of several locations of the facing secondary battery 10 with respect to the area on the Y-Z plane in the same temperature measuring manner as FIGS. 4 and 5. As such, the non-contact temperature sensor unit 200 measures the temperatures of all secondary batteries from one side in the X-axis direction to the other side in the X-axis direction, and when the Z-axis transfer device 130 is transferred by the Y-axis transfer device 120 and the X-axis transfer device 110, the temperatures of the secondary batteries 10 are sequentially measured for each secondary battery 10. In other words, the non-contact temperature sensor unit 200 including the single temperature sensor 202 is configured to descend between the secondary batteries 10 and move up, down, left, and right to measure a temperature, and then ascend again to move and measure the temperature of the next secondary battery 10.

In the current embodiment, the 3-axis transfer device 100 has been described with an example described above, but the 3-axis transfer device 100 is implemented in another configuration as long as reciprocating translational motion in each of X-axis, Y-axis, and Z-axis directions is possible. Also, it would be obvious to one of ordinary skill in the art that the 3-axis transfer device 100 may obviously include, without having to describe in detail herein, a driving unit, such as a linear motor included in an LM guide, and a control unit for controlling movement of the driving unit to perform the reciprocating translational motion in each axis direction. Also, it would be obvious to one of ordinary skill in the art that the 3-axis transfer device 100 may be implemented by using a numerically controlled track and a sub-motor, and other various well-known devices such as a belt, a bearing, a ball nut, or a ball screw to be interlocked with the track and the sub-motor, instead of using an LM guide method. In other words, driving power required for direction movement of the non-contact temperature sensor unit 200 may be provided by using a driving unit such as a linear motor, and the driving power may also be provided by using another general belt and motor, such as a sub-motor, a stepping motor, or the like. Also, the 3-axis transfer device 100 may be suitably moved and perform scheduled temperature measurement by driving the motor according to a control signal of the control unit. The present disclosure is not restricted or limited by location connection relationships, types, and characteristics of transfer devices included in the 3-axis transfer device 100 as long as 3-axis transfer is possible. The present disclosure is characterized in obtaining temperature information for each secondary battery and for each location in one secondary battery by using a temperature measuring device that repeatedly performs a method of transferring a non-contact temperature sensor unit between the secondary batteries to measure a temperature and then withdrawing the non-contact temperature sensor unit to measure temperatures of several secondary batteries.

As such, according to the current embodiment, the temperature is measured in units of the secondary batteries 10 in the tray 30 via the temperature measuring device T1, and the non-contact temperature sensor unit 20 may be driven to measure a temperature by descending between the secondary batteries 10 and then repeatedly measure a temperature of a next secondary battery 10.

Since the non-contact temperature sensor unit 200 is moved via the 3-axis transfer device 100, the temperatures of all secondary batteries 10 in the tray 30 may be measured by using the single temperature sensor 202. Accordingly, since capacity compensation is performed in units of the secondary batteries 10 instead of units of the trays 30, the accuracy of capacity test may be secured. The temperature of the secondary battery 10 may be measured according to locations and times, and the measured temperature information may be accumulated and stored to be used as a database (DB).

Figure 6:
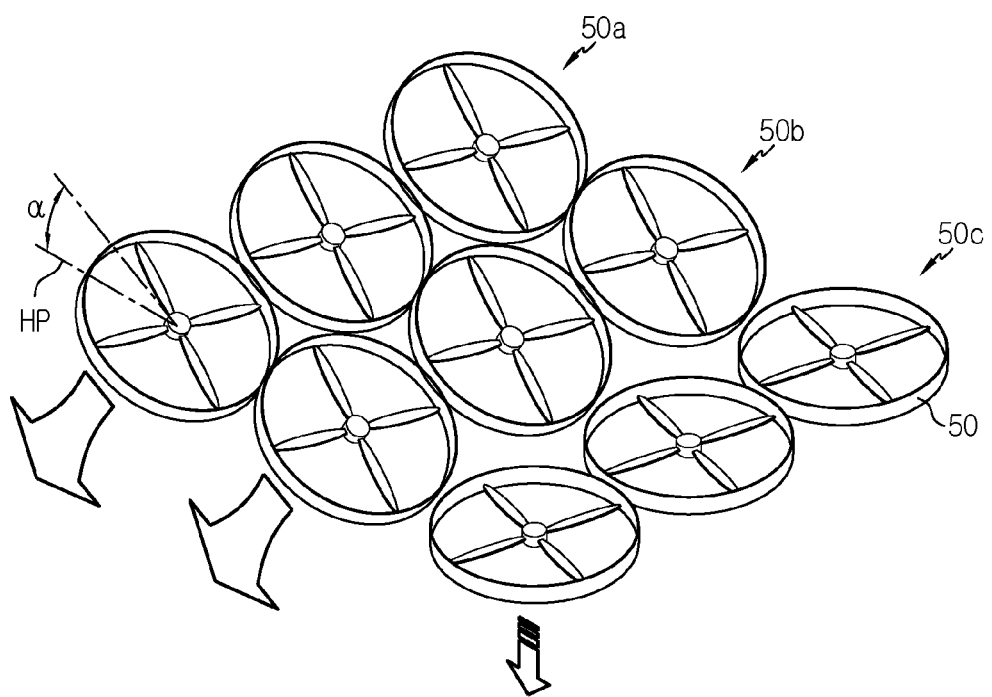
FIG. 6 illustrates a portion of a cooling fan in a state of use of the charging and discharging apparatus, according to the first embodiment of the present disclosure.

FIG. 6 illustrates a portion of the cooling fan in a state of use of the charging and discharging apparatus, according to the first embodiment of the present disclosure.

As described with reference to FIG. 2, the directions of wind and outputs of the cooling fans 50 are individually adjusted based on the temperature information measured by the temperature measuring device T1 according to a location in each of the plurality of secondary batteries 10. Basically, the cooling fan 50 blows the air to the secondary battery 10 directly below, and the direction of wind is adjusted by adjusting an angle α with respect to a horizontal plane HP.

For example, as shown in FIG. 6, when the cooling fans 50 located at a first row are referred to as cooling fans 50a, the cooling fans 50 located at a second row are referred to as cooling fans 50b, and the cooling fans 50 located at a third row are referred to as cooling fans 50c, and a temperature at a left side of the secondary batteries 10 (for example, a side where negative electrode leads are located) is higher based on a temperature measurement result of the temperature measuring device T1, the cooling fans 50 may intensively cool down a portion where the temperature is higher to reduce a temperature deviation from another portion.

In particular, the air volume may be increased at the left side of the secondary batteries 10 by adjusting the directions of wind of the cooling fans 50a. The wind of the cooling fans 50a may be sent to the left side of the secondary batteries 10 by positively tilting the angle α with respect to the horizontal plane HP, and accordingly, the left portion of the secondary batteries 10 is more intensively cooled down, thereby reducing a temperature deviation between left and right sides of the secondary batteries 10. When the temperature at the left side of the secondary batteries 10 is largely different from that at the right side, not only the directions of wind of the cooling fans 50a, but also the directions of wind of the cooling fans 50b are adjusted to increase the wind volume at the left side of the secondary batteries 10 such as to more quickly cool down the secondary batteries 10.

In addition or separately, when the outputs of the cooling fans 50c cooling down the right side of the secondary batteries 10 are reduced, the air volume of the corresponding portion is reduced to decrease the cooling of the right side of the secondary batteries 10. On the other hand, when the outputs of the cooling fans 50a cooling down the left side of the secondary batteries 10 are increased, the air volume of the corresponding portion is increased, thereby further cooling down the left side of the secondary batteries 10.

As such, the charging and discharging apparatus 300 may reduce the temperature deviation of the secondary batteries 10 by controlling and adjusting each of the directions of wind and outputs of the cooling fans 50.

In particular, the temperature of the secondary battery 10 tends to vary according to operations of the cooling fans 50. Accordingly, a control unit may be provided between the temperature measuring device T1 and the cooling fan 50 such that the temperature measurement by the temperature measuring device T1 and the direction of wind and output adjustment of the cooling fan are interconnectedly performed in real-time.

The control unit may be integrated with the control unit of the temperature measuring device T1.

A temperature measuring device may be variously configured. A charging and discharging apparatus according to the present disclosure may be variously implemented by differently configuring a type of the temperature measuring device. The charging and discharging apparatus according to the present disclosure may include not only the temperature measuring device T1 described above, but also various temperature measuring devices described below.

Figure 7:
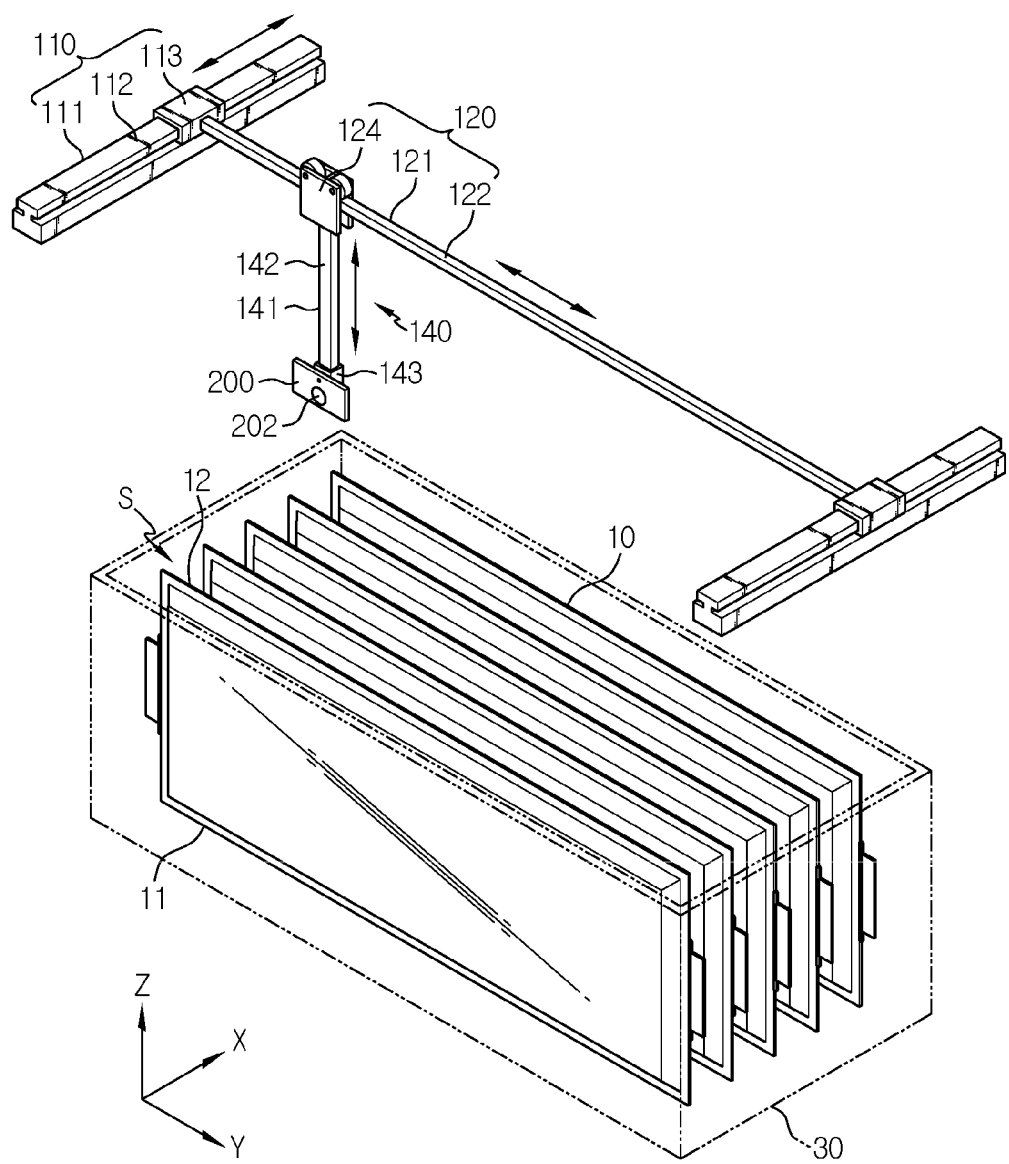
FIG. 7 illustrates a temperature measuring device that may be included in a charging and discharging apparatus, according to a second embodiment of the present disclosure.

FIG. 7 illustrates a temperature measuring device that may be included in a charging and discharging apparatus, according to a second embodiment of the present disclosure. The temperature measuring device T2 is different from the first embodiment described with reference to FIGS. 2 through 6 only in a Z-axis transfer device 140, and may be a representative example for describing another configuration in which reciprocating translational motion in the Z-axis direction is possible. Parts that are the same or similar to the temperature measuring device T1 according to the first embodiment will not be repeatedly described.

In FIG. 7, the Z-axis transfer device 140 includes a Z-axis guide beam 141 to which a Z-axis LM guide 142 erected to form a right angle with the Y-axis guide beam 121 is attached in a length direction thereof, and a Z-axis slide block 143 including a Z-axis LM slider sliding in the length direction by being engaged with the Z-axis LM guide to reciprocate in the length direction of the Z-axis guide beam 141. As such, in the current embodiment, the charging and discharging apparatus including the temperature measuring device T2 that includes LM guides and LM sliders capable of reciprocating translational motion in all X-axis, Y-axis, and Z-axis directions is implemented.

Meanwhile, in the above first and second embodiments, only one non-contact temperature sensor unit 200 and only one Z-axis transfer device 130 or 140 are provided in the temperature measuring device T1 or T2. As a modification, a temperature measuring device may include the numbers of non-contact temperature sensor units 200 and Z-axis transfer devices 130 or 140 corresponding to the number of secondary batteries 10. In this case, the Z-axis transfer device 130 is not required to be transferred in the X-axis direction to measure the temperatures of all secondary batteries 10. Accordingly, the X-axis transfer device 110 described in the first and second embodiments may not be required. A structure supporting the Y-axis transfer device 120 may be included instead of the X-axis transfer device 110. For example, a charging and discharging apparatus may be provided to include a temperature measuring device shown in FIG. 8.

Figure 8:
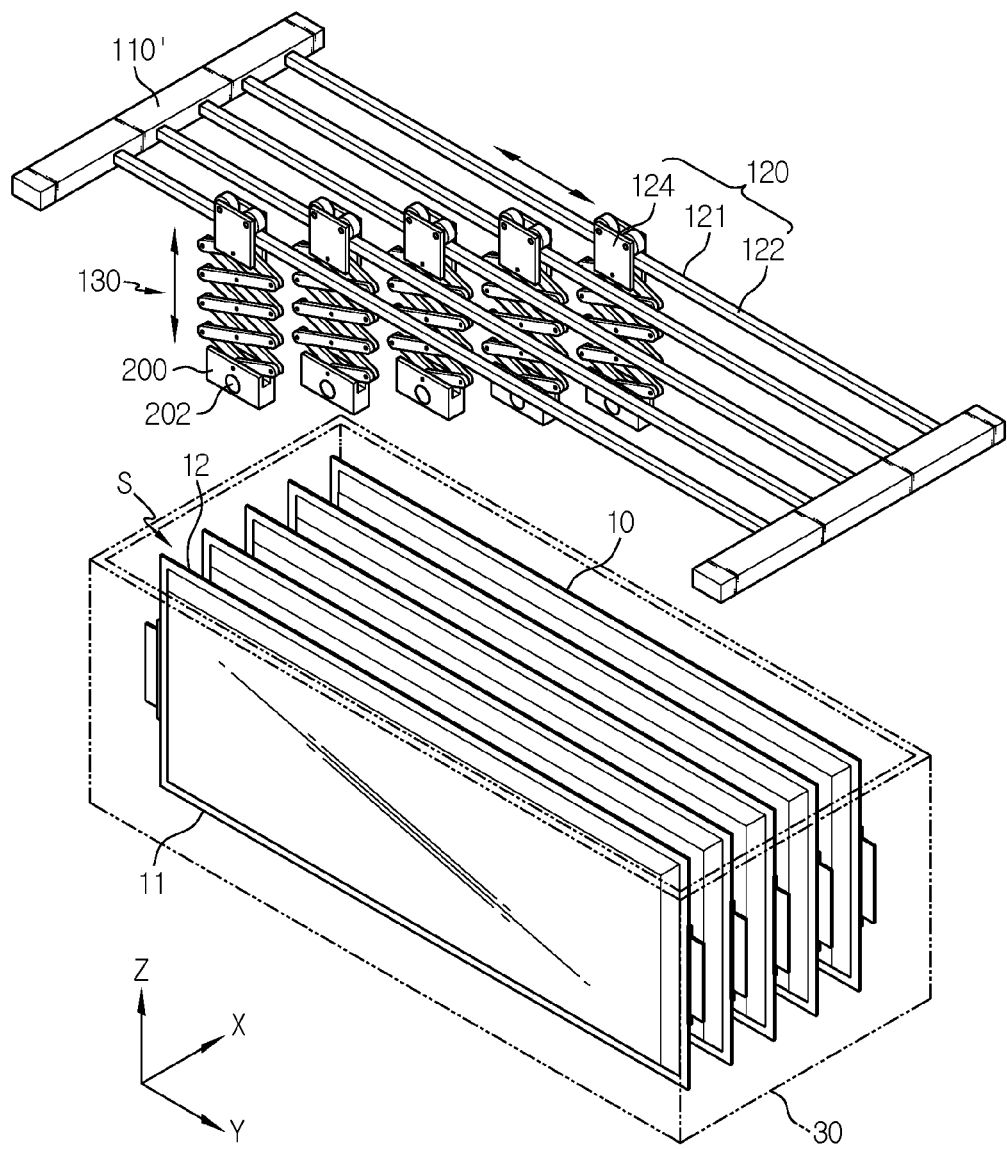
FIG. 8 illustrates a temperature measuring device that may be included in a charging and discharging apparatus, according to a third embodiment of the present disclosure.

FIG. 8 illustrates the temperature measuring device that may be included in a charging and discharging apparatus, according to a third embodiment of the present disclosure.

In the temperature measuring device T3 shown in FIG. 8, the Z-axis transfer devices 130 and the non-contact temperature sensor units 200, each including the single temperature sensor 202, are provided as many as the number corresponding to the number of secondary batteries 10.

In the current embodiment, the non-contact temperature sensor units 200 including the single temperature sensors 202 may descend between the secondary batteries 10 and measure temperatures of all secondary batteries 10 as each non-contact temperature sensor unit 200 is moved up, down, left, and right by the respective Z-axis transfer device 130 and Y-axis transfer device 120 to measure a temperature and ascends again, and the Z-axis transfer device 130 is not required to be transferred in the X-axis direction. Since the plurality of single temperature sensors 202 corresponding to the number of secondary batteries 10 are used, a measurement time may be reduced.

The temperature measuring device T3 is the same as the temperature measuring device T1 according to the first embodiment except that an X-axis frame 110' is provided at the location of the X-axis guide beam 111 of the X-axis transfer device 110 of the first embodiment to support the Y-axis transfer device 120. The X-axis frame 110' is shown in a bar or rod shape like the X-axis guide beam 111, but may be an upright member of a wall shape upright along the Z-axis direction or may be a structure of a bar or rod shape and further including a support for supporting the Y-axis transfer device 120 in the Z-axis direction. Meanwhile, as a modification of the temperature measuring device T3 according to the third embodiment, the Z-axis transfer device 140 according to the second embodiment may be included instead of the Z-axis transfer device 130.

Figure 9:
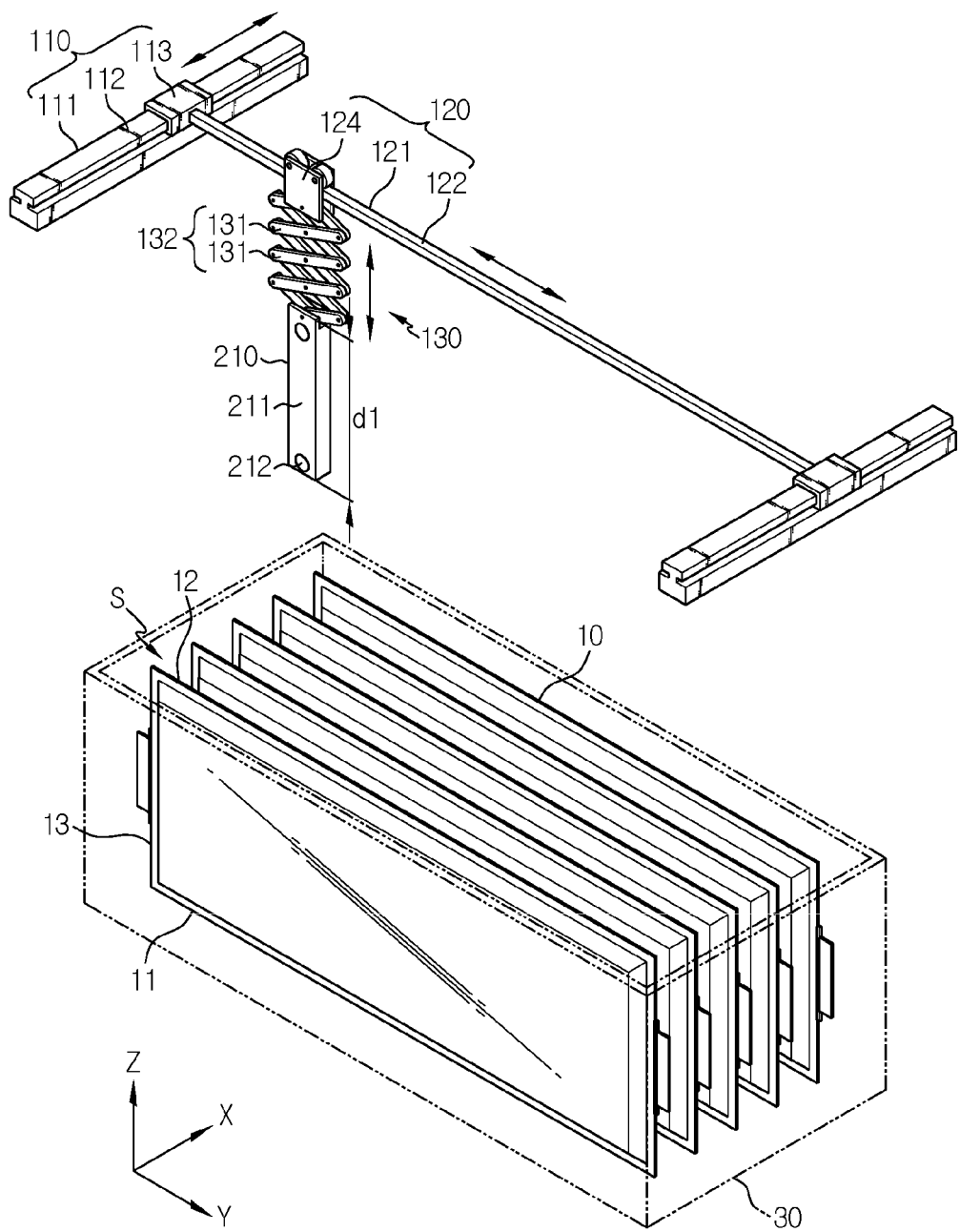
FIG. 9 illustrates a temperature measuring device that may be included in a charging and discharging apparatus, according to a fourth embodiment of the present disclosure.

FIG. 9 illustrates a temperature measuring device that is the same as the first embodiment in that a 3-axis transfer device is included but is different from the first embodiment in a non-contact temperature sensor unit 210.

Referring to FIG. 9, in the temperature measuring device T4 that may be included in a charging and discharging apparatus, according to a fourth embodiment, the non-contact temperature sensor unit 210 includes a strip member 211 of a length d1 corresponding to one side 13 in the Z-axis direction of the secondary batteries 10 and multiple temperature sensors 212 arranged on the strip member 211 along the Z-axis direction. The 3-axis transfer device including the Z-axis transfer device 110, the Y-axis transfer device 120, and the Z-axis transfer device 130 is the same as the first embodiment, the temperature measuring method is similar to the first embodiment, and the measurement time may be reduced because a plurality of sensors are used.

The temperatures of the secondary batteries 10 are sequentially measured for each secondary battery 10 as the non-contact temperature sensor unit 210 measures the temperature from one side in the X-axis direction and the Z-axis transfer device 130 is transferred by the X-axis transfer device 110.

Figure 10:
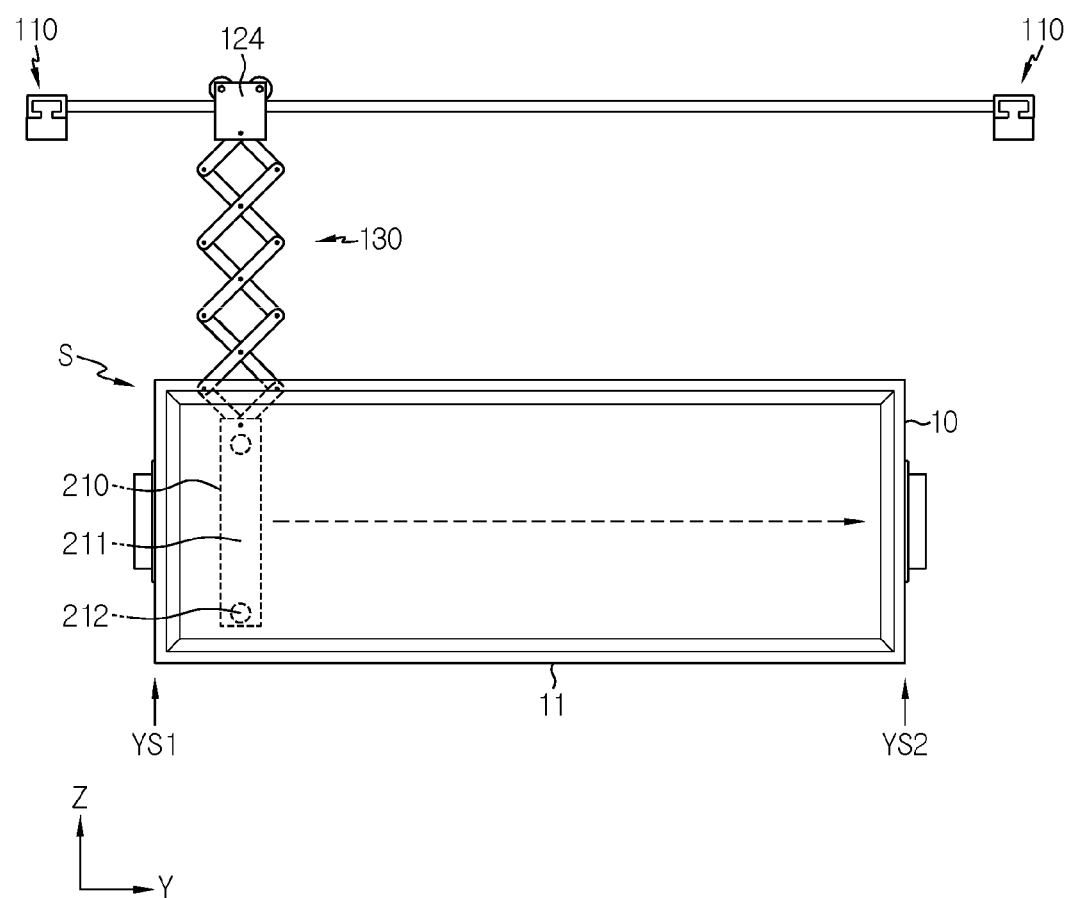
FIG. 10 is a diagram for describing a method of measuring a temperature of one secondary battery by using a temperature measuring device included in the charging and discharging apparatus, according to the fourth embodiment of the present disclosure.

FIG. 10 is a diagram for describing a method of measuring a temperature of one secondary battery by using the temperature measuring device T4 included in the charging and discharging apparatus, according to the fourth embodiment of the present disclosure.

Referring to FIG. 10, the non-contact temperature sensor unit 210 descends between the secondary batteries 10 to be inserted into the space S at the one side YS1 in the Y-axis direction, is transferred up to the other side YS2 Y-axis direction by the Y-axis transfer device 120, and then withdrawn from the space S, and sequentially measures temperatures of several locations of the facing secondary battery 10 with respect to an area on the Y-Z plane while being transferred in the space S.

Meanwhile, as a modification of the fourth embodiment, the Z-axis transfer device 140 according to the second embodiment may be provided instead of the Z-axis transfer device 130. Also, as a modification of the fourth embodiment, a temperature measuring device including the Z-axis transfer devices 130 and the non-contact temperature sensor units 210 as many as the number corresponding to the number of secondary batteries 10 may be provided like the third embodiment.

Figure 11:
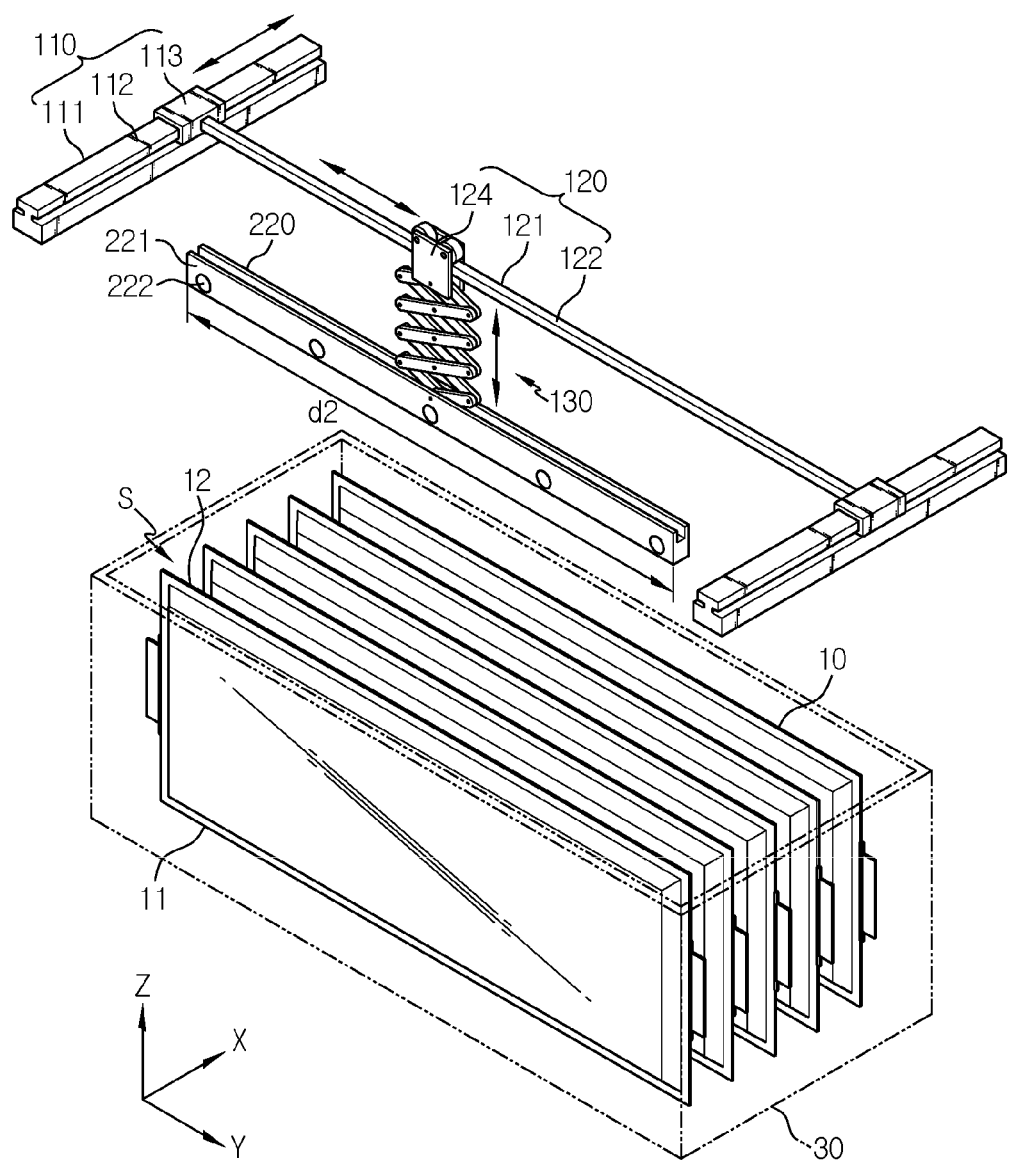
FIG. 11 illustrates a temperature measuring device that may be included in a charging and discharging apparatus, according to a fifth embodiment of the present disclosure.

FIG. 11 illustrates a temperature measuring device that is similar to the fourth embodiment but is different in a non-contact temperature sensor unit 220.

In the temperature measuring device T5 that may be included in a charging and discharging apparatus, according to a fifth embodiment shown in FIG. 11, the non-contact temperature sensor unit 220 includes a strip member 221 of a length d2 corresponding to the one side 11 in the Y-axis direction of the secondary batteries 10 and multiple temperature sensors 222 arranged on the strip member 221 along the Y-axis direction. In other words, for example, the non-contact temperature sensor unit 220 is the same as the fourth embodiment in that multiple temperature sensors arranged in one row are included but is different from the fourth embodiment in that an arrangement direction thereof is orthogonal.

Figure 12:
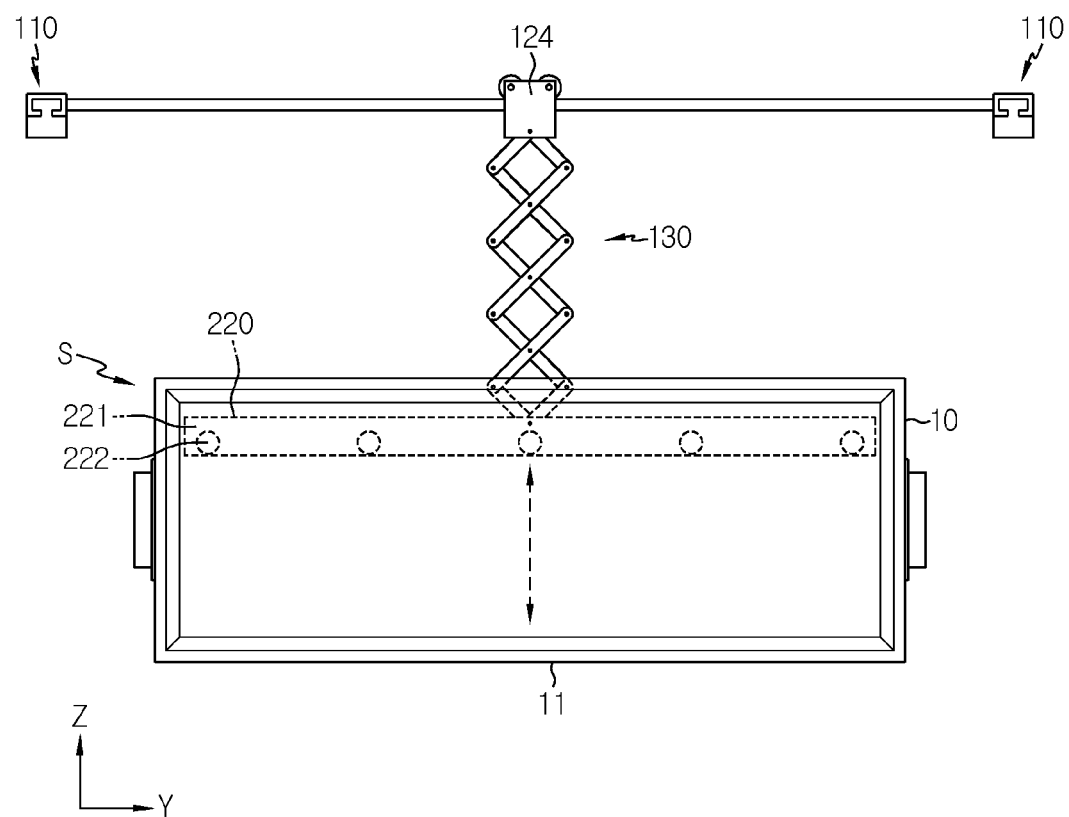
FIG. 12 is a diagram for describing a method of measuring a temperature of one secondary battery by using a temperature measuring device included in the charging and discharging apparatus, according to the fifth embodiment of the present disclosure.

As shown in FIG. 12, the non-contact temperature sensor unit 220 is inserted into the space S by descending between the secondary batteries 10 by the Z-axis transfer device 130 and is withdrawn after being inserted near the one side 11 in the Y-axis direction of the facing secondary battery 10, and sequentially measures temperatures of several locations of the facing secondary battery 10 with respect to an area on the Y-Z plane while being transferred inside the space S.

The non-contact temperature sensor unit 220 measures the temperature from one side in the X-axis direction and the temperatures of the secondary batteries 10 are sequentially measured for each secondary battery 10 while the Z-axis transfer device 130 is transferred by the X-axis transfer device 110.

In the current embodiment, since the Z-axis transfer device 130 is not required to be transferred in the Y-axis direction to measure temperatures of all secondary batteries, another member on which the Z-axis transfer device 130 is mounted and being transferred along the X-axis direction by the X-axis transfer device 110 may be provided instead of the Y-axis transfer device 120 described in the above embodiments. As another example, an embodiment in which the Z-axis transfer device 130 is directly connected to and mounted on the X-axis LM slider 113 of the X-axis transfer device 110 to be transferred in the X-axis direction by the X-axis transfer device 110 is realized without the Y-axis transfer device 120 may be possible. In other words, when the multiple temperature sensors 222 arranged along the Y-axis direction are provided, a 2-axis transfer device including the X-axis transfer device 110 and the Z-axis transfer device 130 may be realized.

Here as well, as a modification of the fifth embodiment, the Z-axis transfer device 140 like the second embodiment may be provided instead of the Z-axis transfer device 130. Also, as a modification of the fifth embodiment, a temperature measuring device including the Z-axis transfer devices 130 and the non-contact temperature sensor units 220 as many as the number corresponding to the number of secondary batteries 10 may be provided like the third embodiment.

Figure 13:
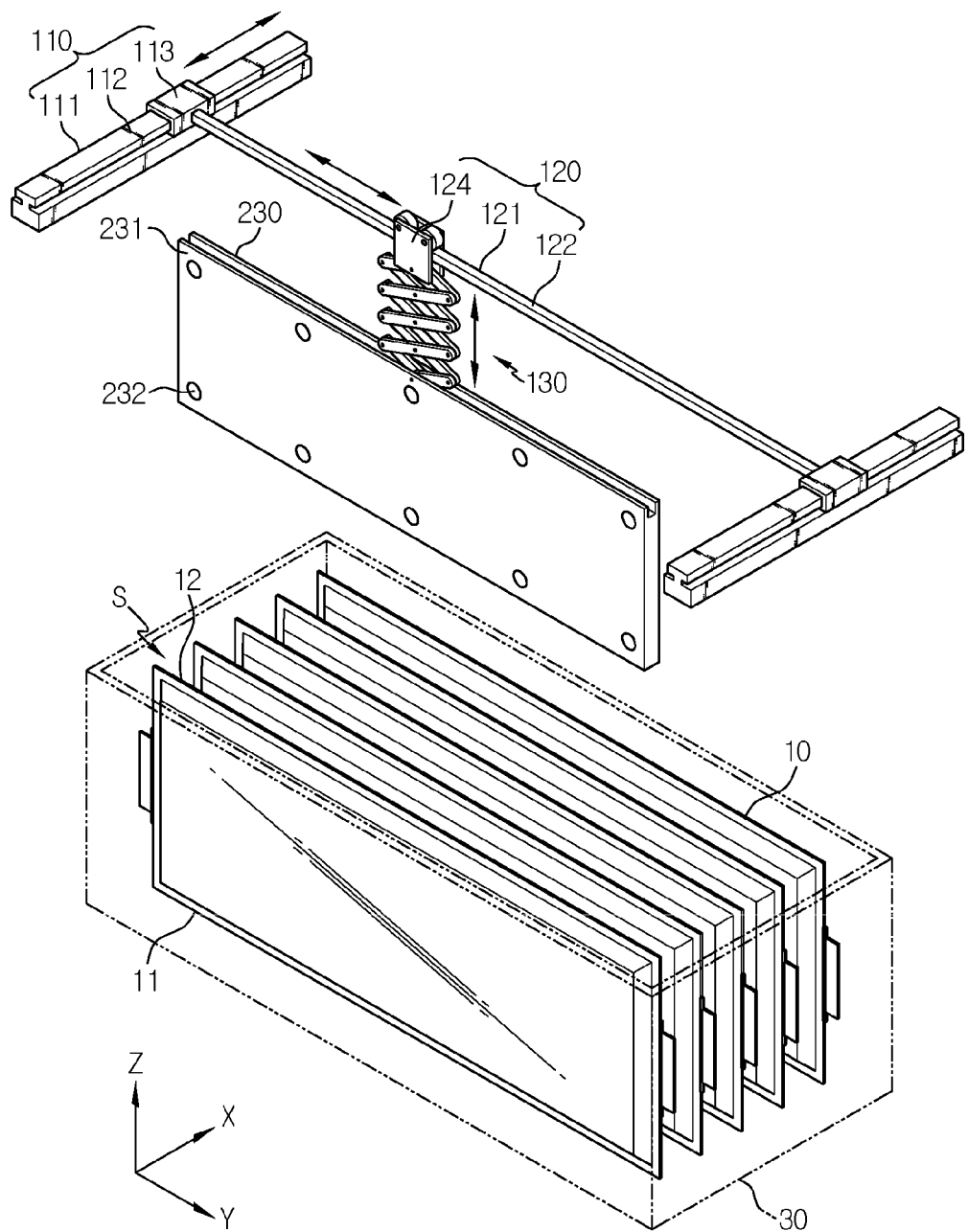
FIG. 13 illustrates a temperature measuring device that may be included in a charging and discharging apparatus, according to a sixth embodiment of the present disclosure.

FIG. 13 illustrates a temperature measuring device that may be included in a charging and discharging apparatus, according to a sixth embodiment of the present disclosure. The sixth embodiment is the same as the first embodiment in that a 3-axis transfer device is included, but is different from the first embodiment in a non-contact temperature sensor unit 230.

Referring to FIG. 13, in the temperature measuring device T6 according to the sixth embodiment, the non-contact temperature sensor unit 230 includes a plate member 231 having an area corresponding to an area of the secondary batteries 10 on the Y-Z plane and multiple temperature sensors 232 arranged on the plate member 231 along the Y-axis and the Z-axis. As shown in FIG. 13, the non-contact temperature sensor unit 230 is inserted into the space S by descending between the secondary batteries 10 to simultaneously measure temperatures of several locations of the facing secondary battery 10 with respect to the area on the Y-Z plane, and then is withdrawn. Since a plurality of sensors are used, measurement time may be further reduced.

Figure 14:
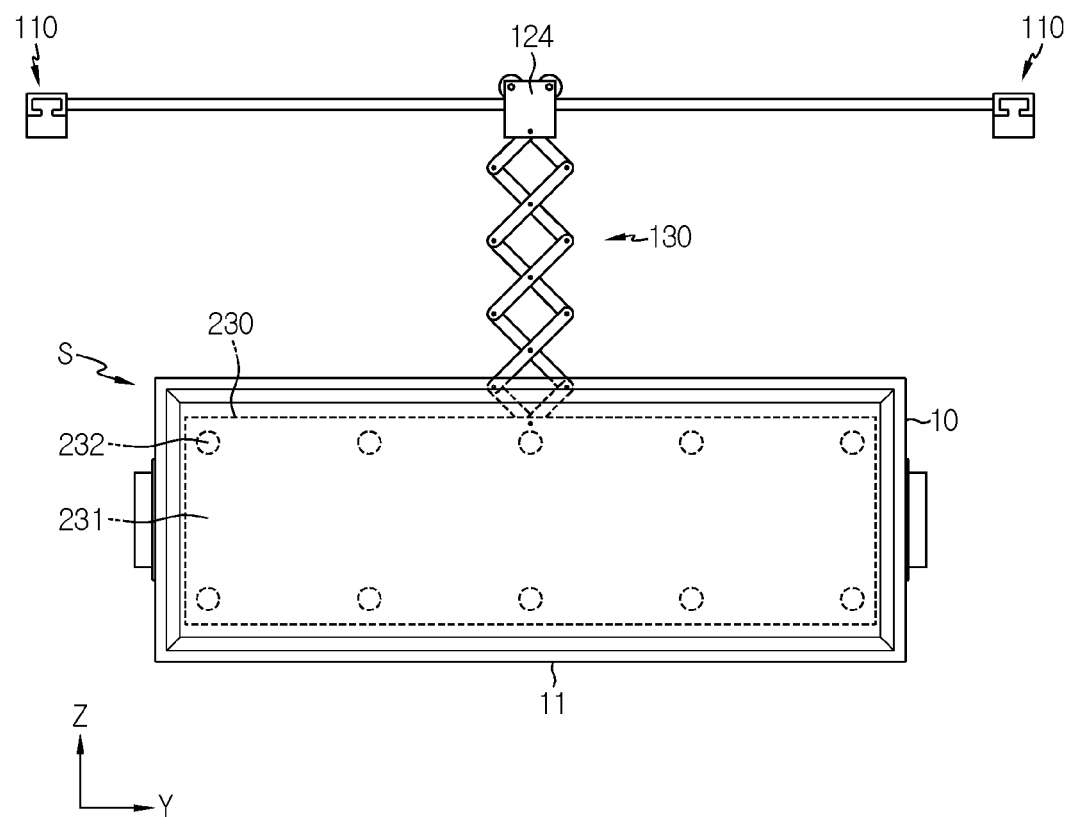
FIG. 14 is a diagram for describing a method of measuring a temperature of one secondary battery by using a temperature measuring device included in the charging and discharging apparatus, according to the sixth embodiment of the present disclosure.

The non-contact temperature sensor unit 230 measures a temperature from one side in the X-axis direction, and the Z-axis transfer device 130 is transferred by the X-axis transfer device 110 to measure the temperature for each secondary battery 10 as described with reference to FIG. 14 such that the temperature measurement is sequentially performed for each secondary battery 10 by repeating in order insertion by Z-axis transfer, withdrawal by transfer in the opposite direction, and movement by X-axis transfer.

In the current embodiment, since the Z-axis transfer device 130 is not required to be transferred in the Y-axis direction to measure the temperatures of all secondary batteries, another member on which the Z-axis transfer device 140 is mounted and being transferred along the X-axis direction by the X-axis transfer device 110 may be provided instead of the Y-axis transfer device 120 described in the above embodiments. As another example, an embodiment in which the Z-axis transfer device 130 is directly connected to and mounted on the X-axis LM slider 113 of the X-axis transfer device 110 to be transferred in the X-axis direction by the X-axis transfer device 110 is realized without the Y-axis transfer device 120 may be possible. In other words, when the multiple temperature sensors 232 arranged along the Y-axis direction are provided, a 2-axis transfer device including the X-axis transfer device 110 and the Z-axis transfer device 130 may be realized as in the fifth embodiment.

Here as well, as a modification of the sixth embodiment, the Z-axis transfer device 140 like the second embodiment may be provided instead of the Z-axis transfer device 130. Also, as a modification of the sixth embodiment, a temperature measuring device including the Z-axis transfer devices 130 and the non-contact temperature sensor units 230 as many as the number corresponding to the number of secondary batteries 10 may be provided like the third embodiment. In this case, the non-contact temperature sensor unit 230 may be transferred only in the Z-axis and is not required to be transferred in the X-axis and Y-axis. Thus, a structure only supporting the Z-axis transfer device 130 may be required without the X-axis transfer device 110 or the Y-axis transfer device 120 described above.

Figure 15:
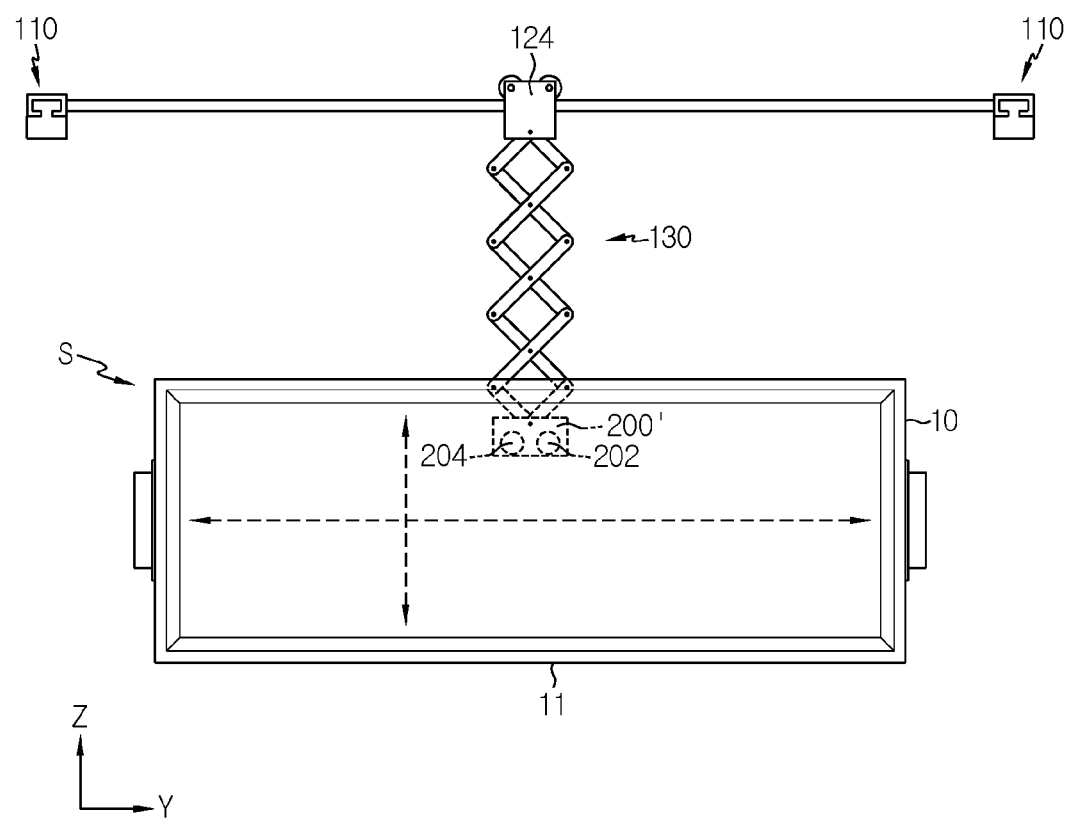
FIG. 15 illustrates an embodiment of a temperature measuring device further including an ambient temperature measuring sensor in addition to a non-contact temperature sensor.

Meanwhile, the present disclosure includes a configuration capable of excluding an effect by a neighboring secondary battery to accurately measure the temperature of each secondary battery 10. The configuration is for accurately measuring an individual temperature of the secondary batteries 10 gathered in one space inside the tray 30. Referring to FIG. 15, a non-contact temperature sensor unit 200' further includes an ambient temperature measuring sensor 204 in addition to the non-contact single temperature sensor 202. An example of the ambient temperature measuring sensor 204 includes a thermistor or a thermocouple. The ambient temperature measuring sensor 204 measures a surrounding temperature. Measurement accuracy may be improved even for a sensor temperature change caused by ambient heat when a surrounding temperature correction algorithm is applied by using the ambient temperature measured by the ambient temperature measuring sensor 204. The surrounding temperature correction algorithm may use an algorithm of well-known equations and computer calculation programs. The ambient temperature measuring sensor 204 may be further included in the multiple temperature sensors 212, 222, and 232 described above with reference to FIGS. 9, 11, and 13.

The number and types of various sensors used in the present disclosure may vary according to costs and spaces. A sensor type may be selected and realized at a lowest possible cost.

Meanwhile, in the above embodiments, the installation location of the cooling fans 50 are the upper portion of the tray 30 based on FIG. 2, but the installation location of the cooling fans 50 is not limited thereto. For example, a modification as shown in FIG. 16 is possible.

Figure 16:
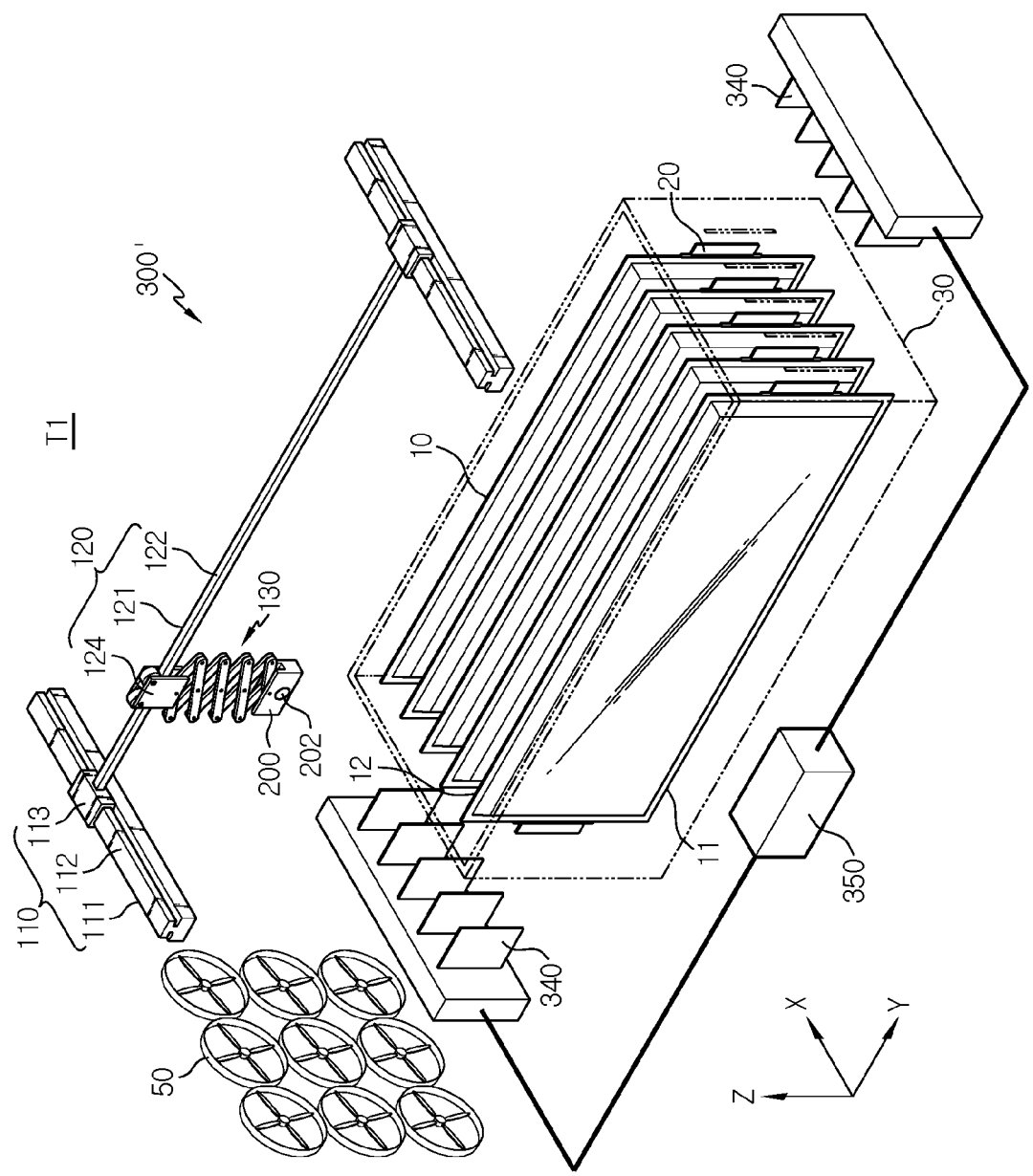
FIG. 16 illustrates an example in which an installation location of a cooling fan is changed, as a modification of the charging and discharging apparatus according to the first embodiment of the present disclosure.

FIG. 16 illustrates an example in which the installation location of the cooling fans is changed, as a modification of the charging and discharging apparatus according to the first embodiment of the present disclosure. Referring to FIG. 16, a charging and discharging apparatus 300' is different from the charging and discharging apparatus 300 of FIG. 2 in the installation location of the cooling fans 50.

The cooling fans 50 are located at a side portion of the tray 30. The cooling fans 50 may be provided in row and column directions on a surface of the side portion of the tray 30, the surface facing the electrode leads 20 of the secondary batteries 10, such that the several secondary batteries 10 are cooled down. In this case as well, the directions of wind and outputs of the cooling fans 50 are individually adjusted. An adjusting method is as described above.

Generally, since the secondary battery 10 generates more heat from the electrode lead 20 than other portions, efficient cooling for the electrode lead 20 is enabled by locating the cooling fans 50 at the side portion of the tray 30. Also, the cooling fans 50 do not interfere with the movement of the temperature measuring device T1 by being located at the side portion of the tray 30.

As such, the installation location of the cooling fans 50 may be the upper portion or side portion of the tray 30. For the efficient cooling, the cooling fans 50 may be installed at a lower portion of the tray 30, may be installed at the upper portion and the lower portion in pairs, or may be installed in both side portions in pairs.

According to the present disclosure described above, a charging and discharging apparatus including a movable temperature measuring device that transfers a non-contact temperature sensor unit via Z-axis ascending or descending by a Z-axis transfer device is basically provided. Here, the number of non-contact temperature sensors required to measure a temperature of each secondary battery may be reduced by further using a Y-axis transfer device and/or an X-axis transfer device. As such, temperatures of a plurality of secondary batteries may be measured by using the number of non-contact temperature sensors as small as possible by implementing the temperature measuring device in a movable type.

According to the present disclosure, in particular, the temperature may be measured for each secondary battery by accommodating the secondary batteries in a tray and transferring the non-contact temperature sensor by using a 3-axis transfer device. Since temperatures of several locations of the secondary battery may be measured by using a single sensor or multiple sensors, research data may be obtained by recording the measured temperatures to build a database (DB).

Also, the temperature of each secondary battery inside the tray may be measured by using the non-contact temperature sensor unit and directions of wind and outputs of cooling fans may be adjusted based on the measured temperature information, in response to the temperature of the secondary battery, which continuously changes during charging and discharging. Accordingly, the charging and discharging of uniform quality may be realized by improving a temperature deviation.

A first characteristic of the present disclosure is that using of a movable non-contact temperature measuring device is proposed. Also, a second characteristic is that a plurality of cooling fans of which directions of wind and outputs are individually adjustable in response to temperature information are included.

According to the present disclosure, a temperature of each secondary battery in a tray is measured by using a movable non-contact temperature sensor and directions of wind and outputs of cooling fans are adjusted based on the measured temperature information, in response to the temperature of the secondary battery, which continuously changes during charging and discharging. Accordingly, a temperature deviation between the several secondary batteries accommodated in the tray may be reduced. Moreover, a temperature deviation may occur according to locations of a positive electrode lead and a negative electrode lead in one secondary battery. According to the present disclosure, such a temperature deviation may be reduced.

As such, a charging and discharging apparatus according to the present disclosure may realize charging and discharging of uniform quality for several secondary batteries by improving a temperature deviation.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A charging and discharging apparatus comprising:
 a temperature measuring device for measuring a temperature of at least one secondary battery of a plurality of secondary batteries arranged spaced apart from each other along an X-axis direction in an upright state with a side of the at least one secondary battery extending in a Y-axis direction at a bottom of the at least one secondary battery;
 a tray configured to accommodate the plurality of secondary batteries arranged spaced apart from each other in the X-axis direction in the upright state;
 a charging and discharging probe connected to a power supplier, which are capable of individually applying power to the plurality of secondary batteries; and
 a plurality of cooling fans provided to cool the plurality of secondary batteries and of which directions of wind and outputs are individually adjusted based on temperature information measured by the temperature measuring device according to a location in each secondary battery of the plurality of secondary batteries,
 wherein the temperature measuring device comprises:
 a non-contact temperature sensor unit being insertable into a space between adjacent secondary batteries of the plurality of secondary batteries to measure a temperature of the at least one secondary battery that the non-contact temperature sensor faces in a non-contact manner; and
 a Z-axis transfer device configured to raise or lower the non-contact temperature sensor unit in a Z-axis direction perpendicular to the X-axis direction and the Y-axis direction to insert the non-contact temperature sensor unit into the space downward from a location spaced apart from the plurality of secondary batteries in the Z-axis direction and to withdraw the non-contact temperature sensor unit upward.

2. The charging and discharging apparatus of claim 1, wherein the plurality of cooling fans are provided in row and column directions at an upper portion of the tray to blow air to the plurality of secondary batteries directly below, and wherein the directions of the wind are adjusted by adjusting an angle with, respect to a horizontal plane.

3. The charging and discharging apparatus of claim 1, wherein the plurality of cooling fans intensively cools a portion of the plurality of secondary batteries where a temperature is higher based on the temperature information measured by the temperature measuring device according to the location in each of the plurality of secondary batteries to reduce a temperature deviation from another portion of the plurality of secondary batteries.

4. The charging and discharging apparatus of claim 1, wherein temperature measurement by the temperature measuring device and direction of wind and output adjustment by the plurality of cooling fans are interconnectedly performed in real-time.

5. The charging and discharging apparatus of claim 1, wherein the temperature measuring device further comprises a Y-axis transfer device configured to transfer the Z-axis transfer device mounted thereon along the Y-axis direction.

6. The charging and discharging apparatus of claim 5, wherein the non-contact temperature sensor unit comprises a single temperature sensor or comprises multiple temperature sensors arranged along the Z-axis in a length corresponding to a side of the at least one secondary battery extending in the Z-axis direction.

7. The charging and discharging apparatus of claim 5, wherein the temperature measuring device further comprises an X-axis transfer device configured to transfer the Y-axis transfer device mounted thereon along the X-axis direction.

8. The charging and discharging apparatus of claim 7, wherein the non-contact temperature sensor unit comprises a single temperature sensor or comprises multiple temperature sensors arranged along the Z-axis in a length corresponding to a side of the at least one secondary battery extending in the Z-axis direction.

9. The charging and discharging apparatus of claim 1, wherein the temperature measuring device further comprises an X-axis transfer device configured to transfer the Z-axis transfer device mounted thereon along the X-axis direction.

10. The charging and discharging apparatus of claim 9, wherein the non-contact temperature sensor unit comprises multiple temperature sensors arranged along the Y-axis direction in a length corresponding to the side of the at least one secondary battery extending in the Y-axis direction or comprises a plate member having an area corresponding to an area defined in a Y-Z plane of the at least one secondary battery with multiple temperature sensors arranged on the plate member along the Y-axis and Z-axis directions.

11. The charging and discharging apparatus of claim 1, wherein the non-contact temperature sensor unit further comprises a temperature sensor for measuring an ambient temperature.

12. The charging and discharging apparatus of claim 1, wherein the plurality of cooling fans are provided in row and column directions on a surface of a side portion of the tray to face electrode leads of the plurality of secondary batteries.

* * * * *